(12) United States Patent
Kobayashi et al.

(10) Patent No.: US 7,878,286 B2
(45) Date of Patent: Feb. 1, 2011

(54) FRONT STRUCTURE OF VEHICLE

(75) Inventors: Taichi Kobayashi, Higashihiroshima (JP); Yukiichirou Shimada, Higashihiroshima (JP); Shirou Nakatani, Higashihiroshima (JP); Nobuyuki Ikemoto, Hiroshima (JP); Akifumi Ohno, Hiroshima (JP)

(73) Assignee: Mazda Motor Corporation (JP)

( * ) Notice: Subject to any disclaimer, the term of this patent is extended or adjusted under 35 U.S.C. 154(b) by 282 days.

(21) Appl. No.: 12/101,924

(22) Filed: Apr. 11, 2008

(65) Prior Publication Data
US 2008/0251306 A1 Oct. 16, 2008

(30) Foreign Application Priority Data

| Apr. 13, 2007 | (JP) | ............................. 2007-106046 |
| Apr. 13, 2007 | (JP) | ............................. 2007-106047 |
| Apr. 25, 2007 | (JP) | ............................. 2007-115072 |
| Apr. 25, 2007 | (JP) | ............................. 2007-115073 |

(51) Int. Cl.
*B60K 13/04* (2006.01)
(52) U.S. Cl. ..................... 180/309; 180/296; 180/89.2
(58) Field of Classification Search .................. 180/292, 180/297, 296, 309, 68.2, 69.1, 311; 296/204, 296/208, 187.06
See application file for complete search history.

(56) References Cited

U.S. PATENT DOCUMENTS

| 5,195,607 | A | * | 3/1993 | Shimada et al. ............. 180/296 |
| 5,251,720 | A | * | 10/1993 | Hasetoh et al. ............. 180/297 |
| 5,529,143 | A | | 6/1996 | Komatsu et al. |
| 5,555,932 | A | * | 9/1996 | Dudley ........................ 180/296 |
| 5,813,491 | A | * | 9/1998 | Sato et al. ................... 180/309 |
| 6,173,800 | B1 | * | 1/2001 | Steenackers et al. ....... 180/89.2 |
| 6,260,652 | B1 | * | 7/2001 | Steenackers et al. ........ 180/296 |
| 6,298,935 | B1 | * | 10/2001 | Steenackers et al. ....... 180/89.2 |
| 6,378,645 | B1 | * | 4/2002 | Uegane et al. .............. 180/309 |
| 6,502,659 | B2 | * | 1/2003 | Akasaka ..................... 180/309 |
| 6,536,548 | B2 | * | 3/2003 | Steenackers et al. ....... 180/89.2 |
| 6,663,171 | B2 | * | 12/2003 | Hashirayama et al. ...... 296/204 |
| 6,688,676 | B1 | * | 2/2004 | Sato ....................... 296/187.05 |
| 7,364,002 | B2 | * | 4/2008 | Mabuchi et al. ............. 180/296 |

FOREIGN PATENT DOCUMENTS

DE 4207193 A1 10/1992

(Continued)

OTHER PUBLICATIONS

European Search Report; EP08006887; Aug. 4, 2008.

*Primary Examiner*—Hau V Phan
(74) *Attorney, Agent, or Firm*—Studebaker & Brackett PC; Donald R. Studebaker

(57) ABSTRACT

A tunnel-expansion portion is provided at a front portion of a tunnel portion. The tunnel-expansion portion projects upward greatly and widely so as to provide components of an exhaust system that extend rearward from an exhaust manifold therein (outside a vehicle compartment). Accordingly, there can be provided a front structure of a vehicle, in which an engine is laterally disposed in an engine room at a front portion of the vehicle, an intake pipe is disposed in front of the engine, and an exhaust pipe is disposed in back of the engine, which can improve an exhaust efficiency and a vehicle safety against a vehicle crash, without providing an improperly-large longitudinal space between the engine and the dash panel.

18 Claims, 29 Drawing Sheets

FOREIGN PATENT DOCUMENTS

| | | |
|---|---|---|
| DE | 102004032146 A1 | 11/2005 |
| EP | 0429061 A1 | 5/1991 |
| EP | 1167164 A1 | 1/2002 |
| EP | 1329606 A2 | 7/2003 |
| JP | 11-198663 A1 | 7/1999 |

* cited by examiner

Vehicle Forward

FRONT STRUCTURE OF VEHICLE

BACKGROUND OF THE INVENTION

The present invention relates to a front structure of a vehicle, and particularly relates to a front structure of a vehicle, in which an engine is laterally disposed in an engine room at a front portion of the vehicle, an intake pipe is disposed in front of the engine, and an exhaust pipe is disposed in back of the engine.

Conventionally, a front-engine front-drive type (hereinafter, referred to as FF type) has been adopted to a normal vehicle for a roomy vehicle compartment. Herein, an engine of the vehicle is generally disposed laterally (a cylinder line is located along a vehicle width direction) so that an output shaft and a drive shaft of the engine are located in parallel because of its superior drive efficiency.

Further, in recent years many vehicles have adopted a layout in which an exhaust pipe is disposed in back of the engine so that the distance from an exhaust port to a catalyst can be shortened in order to provide a low emission of exhaust gas.

Japanese Patent Laid-Open Publication No. 11-198663, for example, discloses a FF type of vehicle having such an exhaust-back layout.

Herein, it may be preferable that a layout of the exhaust pipe be such that the exhaust pipe extends as straightly as possible to improve an exhaust efficiency and thereby an engine output.

An exhaust pipe of the vehicle disclosed in the above-described patent publication shows a crank-shape layout. That is, the exhaust pipe extending from an upper portion of the engine first bends downward vertically and then extends rearward horizontally so as to get around a dash panel of the vehicle.

The engine having such a complexly-bent exhaust pipe could not improve the exhaust efficiency, so that the engine output could not increased.

Further, the above-described exhaust-back layout engine has a concern that a vehicle crash would cause the dash panel to be pushed rearward greatly because of pushing by the exhaust pipe, so that a rearward deformation of the dash panel would become improperly large.

Although a sufficient longitudinal space provided between the engine and the dash panel may reduce the above-described rearward deformation of the dash panel, this layout would deteriorate the roomy vehicle compartment because the dash panel inevitably needs to be located rearward. Further, this layout may require the engine to be located forward, so that a weight balance of the vehicle would deteriorate and thereby the maneuverability of the vehicle would deteriorate.

SUMMARY OF THE INVENTION

The present invention has been devised in view of the above-described matters, and an object of the present invention is to provide a front structure of a vehicle, in which an engine is laterally disposed in an engine room at a front portion of the vehicle, an intake pipe is disposed in front of the engine, and an exhaust pipe is disposed in back of the engine, which can improve an exhaust efficiency and a vehicle safety against a vehicle crash, without providing an improperly-large longitudinal space between the engine and the dash panel.

According to the present invention, there is provided a front structure of a vehicle, comprising an engine laterally disposed in an engine room at a front portion of the vehicle, an intake pipe of the engine, the intake pipe being disposed in front of the engine, an exhaust pipe of the engine, the exhaust pipe being disposed in back of the engine so as to extend downward and rearward from an exhaust port provided at an upper portion of the engine with a specified grade, a tunnel portion provided at a center, in a vehicle width direction, of a connection portion between a dash panel to constitute a front wall of a vehicle compartment and a floor panel, the tunnel portion being configured to project toward an inside of the vehicle compartment and extend in a vehicle longitudinal direction, and a tunnel-expansion portion provided at a front portion of the tunnel portion, the tunnel-expansion portion being configured to project upward greatly along the exhaust pipe, the tunnel-expansion portion including an upper-wall face that has a slant that corresponds to the specified grade of the exhaust pipe.

According to the present invention, since the tunnel-expansion portion projecting upward greatly at the front portion of the tunnel portion is provided, the exhaust pipe extending downward and rearward with the specified grade can be provided inside (below) the tunnel-expansion portion so as to extend as straightly as possible. Thereby, the exhaust pipe can be disposed in back of the engine without bending improperly, with the engine located near the dash panel. Further, the exhaust pipe can be located inside the tunnel-expansion portion properly, so that it can be made move inside the tunnel portion properly and smoothly at the vehicle crash.

According to an embodiment of the present invention, the exhaust port of the engine is provided so as to be located below an extension line of the slant of the upper-wall face of the tunnel-expansion portion. Thereby, the straight-extending layout of the exhaust pipe can be achieved more surely. Further, the guidance of the exhaust pipe into the tunnel portion can be achieved more properly. Thus, the exhaust efficiency of the engine can be more improved, and the improper influence of the exhaust pipe to the dash panel at the vehicle crash can be prevented surely.

According to another embodiment of the present invention, the exhaust pipe is comprised of a plurality of pipes that are located substantially side by side in the vehicle width direction, and the tunnel-expansion portion has side-wall faces thereof that are away from each other with a specified distance in the vehicle width direction that is greater than a width of the plurality of exhaust pipes located side by side. Thereby, all of the plurality of exhaust pipes can be made move into the side-wall faces of the tunnel-expansion portion when the engine is pushed rearward (retreats) at the vehicle crash, so that the pushing back (retreat) of the dash panel by the exhaust pipe can be prevented.

According to another embodiment of the present invention, the side-wall faces of the tunnel-expansion portion are disposed in an oblique shape respectively in such a manner that the distance of a front-side portion thereof is wider, and an oblique angle of the side-wall faces of the tunnel-expansion portion is configured to be greater than an oblique angle of the exhaust pipes located at both-side ends that are provided obliquely so as to extend inwardly. Thereby, the exhaust pipes moving into the tunnel-expansion portion can be properly guided by the both side-wall faces, so that the safety at the vehicle crash can be improved.

According to another embodiment of the present invention, the exhaust pipes comprise a collective pipe where plural exhaust pipes are collected, and the collective pipe is disposed at a location that corresponds to the tunnel-expansion portion. Thereby, all of the plurality of exhaust pipes can be made move inside the tunnel-expansion portion. Namely, there is a possibility that all of the exhaust pipes could not be made move inside the tunnel-expansion portion at the vehicle crash if the collective pipe was disposed in front of the tunnel-expansion portion. Thus, the guidance of the plural exhaust pipes moving inside the tunnel-expansion portion can be achieved surely, so that the safety at the vehicle crash can be improved.

According to another embodiment of the present invention, the exhaust pipe comprises a plurality of separate pipes that are connected to cylinders of the engine and two collective pipes where the plural separate pipes are collected, and the two collective pipes are disposed substantially side by side in a vertical direction at a location that corresponds to the tunnel-expansion portion. Thereby, the two collective pipes can be located with a narrower space just for a single pipe when viewed from above (in a plan view). Thus, a wide space for the exhaust pipes moving vertically at the vehicle crash can be properly narrowed in the vehicle width direction.

According to another embodiment of the present invention, there is provided a propeller shaft to transmit a drive force of the engine to rear wheels, and the propeller shaft is disposed on a side of two collective pipes in the vehicle width direction. Thereby, it can be prevented for the propeller shaft to interfere with the exhaust pipes moving vertically at the vehicle crash. Thus, in a case where the propeller shaft is disposed inside the tunnel-expansion portion, the propeller shaft does not improperly influence the exhaust pipes moving vertically, so that the exhaust pipes moving into the tunnel-expansion portion can be achieved more surely. Accordingly, the safety of a four-wheel-drive vehicle with a compact tunnel-expansion portion can be improved.

According to another embodiment of the present invention, the propeller shaft is positioned at a level that is located substantially between the two collective pipes in the vertical direction. Thereby, the propeller shaft can be disposed properly near the collective exhaust pipes by using a gap formed between the two collective pipes. Thus, there may be no need of a wide space for the layout of the propeller shaft in the vehicle width direction, so that the tunnel-expansion portion can be made compact properly.

According to another embodiment of the present invention, the exhaust pipe comprises a plurality of separate pipes that are connected to cylinders of the engine and two collective pipes where the plural separate pipes are collected, and the two collective pipes are disposed substantially side by side in the vehicle width direction at a location that corresponds to the tunnel-expansion portion. Thereby, the two collective pipes can be located substantially straightly when viewed from the side, without offsetting vertically. Thus, the exhaust efficiency of the engine can be improved.

According to another embodiment of the present invention, there is provided the propeller shaft to transmit the drive force of the engine to rear wheels, and the propeller shaft is disposed below the two collective pipes. Thereby, the collective pipes can be properly disposed by using a space above the propeller shaft. Thus, the two collective pipes can be disposed so as to extend as straightly as possible without receiving any restriction from the propeller shaft. Accordingly, the exhaust efficiency of the engine of the four-wheel-drive vehicle can be improved.

According to another embodiment of the present invention, the exhaust pipe further comprises a collective portion where the two collective pipes are collected, and the collective portion is disposed on a side of the propeller shaft. Thereby, the exhaust pipe can be disposed so as to extend rearward and downward avoiding the propeller shaft, with a narrow disposition space. Thus, the straight-extending layout of the exhaust pipe can be achieved properly, without improperly increasing the width of tunnel-expansion portion in the vehicle width direction.

According to another embodiment of the present invention, at the exhaust pipe are provided a catalyst and/or a flexible tube, which are disposed at a location that corresponds to the tunnel-expansion portion. Thereby, the catalyst or the flexible tube can be disposed by using a relatively large space inside the tunnel-expansion portion. Thus, there is no need of providing a space between the engine and the dash panel for these members, so that the safety of the vehicle against the vehicle crash can be further improved. In particular, air (heat) around the catalyst heated can be properly discharged toward the rear of the vehicle by utilizing the tunnel portion extending longitudinally. Accordingly, a heat damage caused by the catalyst can be properly prevented.

According to another embodiment of the present invention, a steering mechanism to steer front wheels is disposed in front of the catalyst. Thereby, the heated air by the catalyst can be prevented from flowing down through the steering mechanism. Thus, the heat damage of the steering mechanism can be avoided, so that the durability of the steering mechanism can be maintained.

According to another embodiment of the present invention, the engine is provided slant in such a manner that the upper portion thereof is located rearward. Thereby, there can be provided spaces in front of the upper portion of the engine and in back of a lower portion of the engine. Further, the position of the exhaust port of the engine can be lowered. Accordingly, the disposition space of the intake pipe in front of the engine can be enlarged. Also, a front differential disposed behind the engine can be located forward. Further, since the position of the exhaust port of the engine is lowered, the exhaust pipe can be disposed so as to extend as straightly as possible, thereby improving the exhaust efficiency of the engine. In addition, sine the distance to the catalyst can be shortened, the catalyst can be activated quickly. Accordingly, the function of intake and exhaust system of the engine can be improved due to the above-described rearward-slant disposition of the engine, and the maneuverability of the vehicle can be improved due to a shortened overhang of the vehicle.

Other features, aspects, and advantages of the present invention will become apparent from the following description which refers to the accompanying drawings.

BRIEF DESCRIPTION OF THE DRAWINGS

FIG. 4 is an entire plan view, including vehicle-body frames and the like.

FIG. 5 is an entire bottom view, including the vehicle-body frames and the like.

FIG. 8A shows the one in an initial stage; FIG. 8B shows the one in a middle stage; and FIG. 8C shows the one in a latter stage.

FIG. 9A shows the one in an initial stage; and FIG. 9B shows the one in a latter stage.

FIG. 14 is an entire plan view, including the vehicle-body frames and the like.

FIG. 15 is an entire bottom view, including the vehicle-body frames and the like.

FIG. 18A shows the one in the initial stage; FIG. 18B shows the one in the middle stage; and FIG. 18C shows the one in the latter stage.

FIG. 23 is an entire plan view, including the vehicle-body frames and the like.

FIG. 24 is an entire bottom view, including the vehicle-body frames and the like.

FIG. 28A shows the one in the initial stage; FIG. 28B shows the one in the middle stage; and FIG. 28C shows the one in the latter stage.

DETAILED DESCRIPTION OF THE INVENTION

Hereinafter, a front structure of a vehicle according to preferred embodiments of the present invention will be described referring to the accompanying drawings.

Embodiment 1

Figure 1:
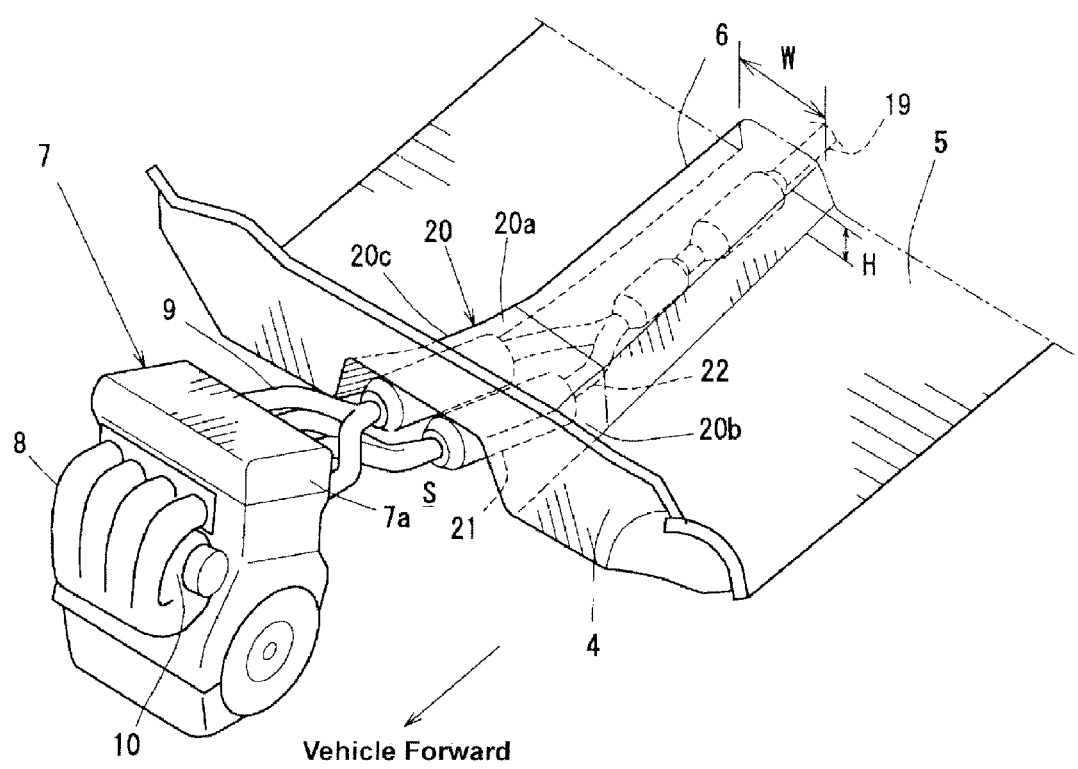
FIG. 1 is a perspective view showing a characteristic part of a front structure of a vehicle according to a first embodiment of the present invention.
Figure 2:
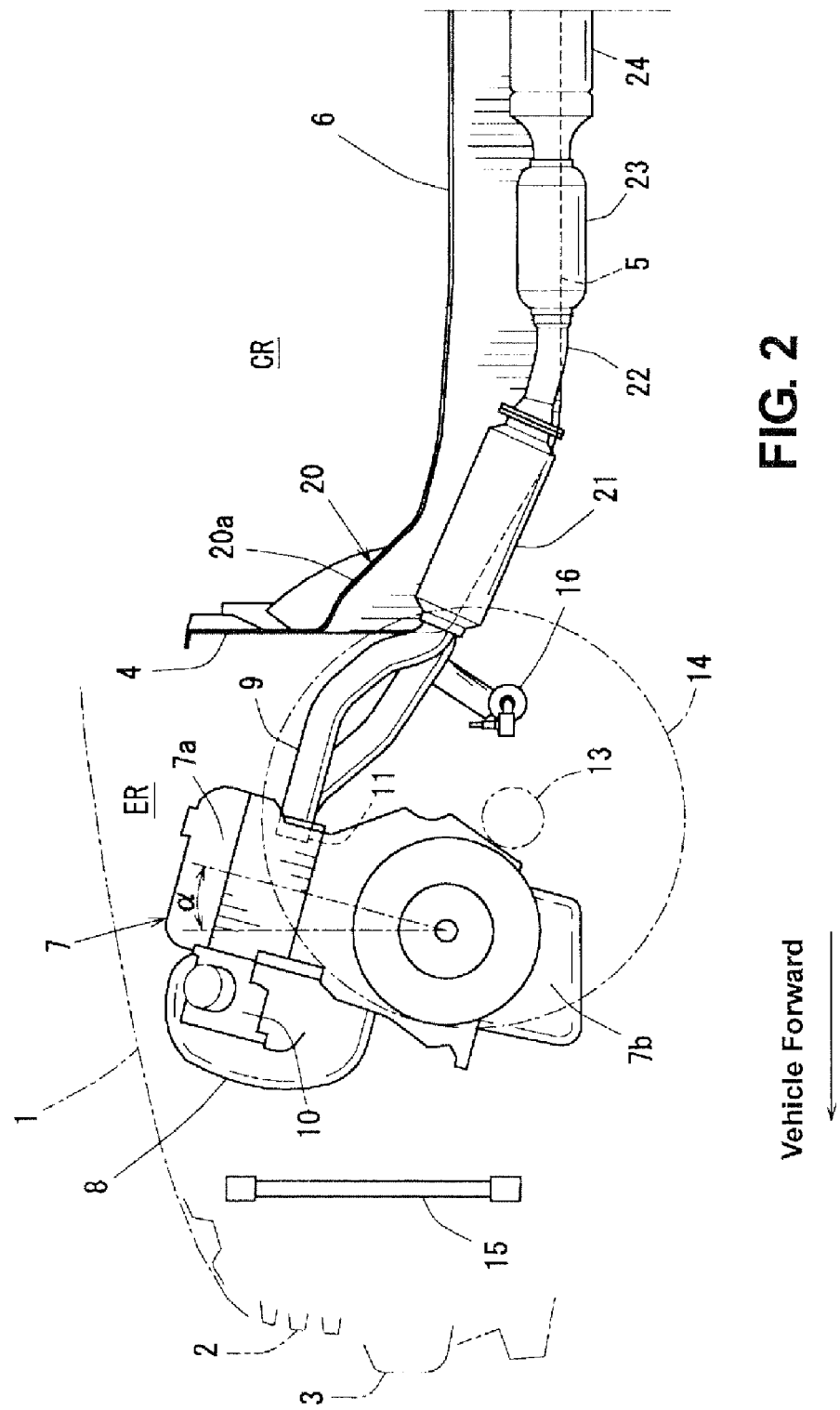
FIG. 2 is an entire side view of the front structure of the vehicle.
Figure 3:
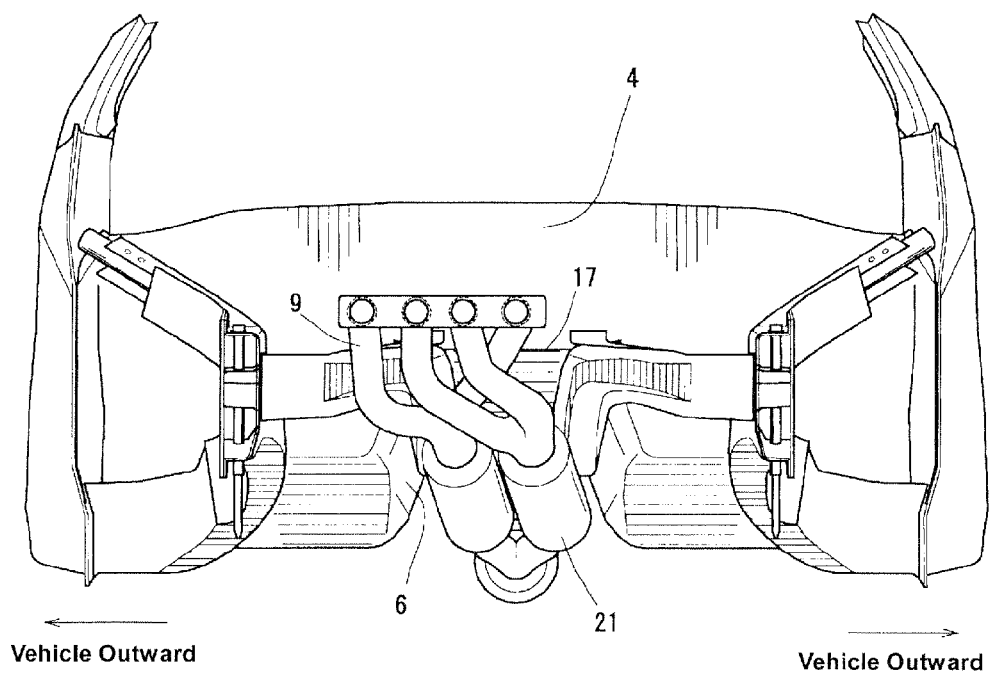
FIG. 3 is an entire elevation view, excluding an engine.
Figure 4:
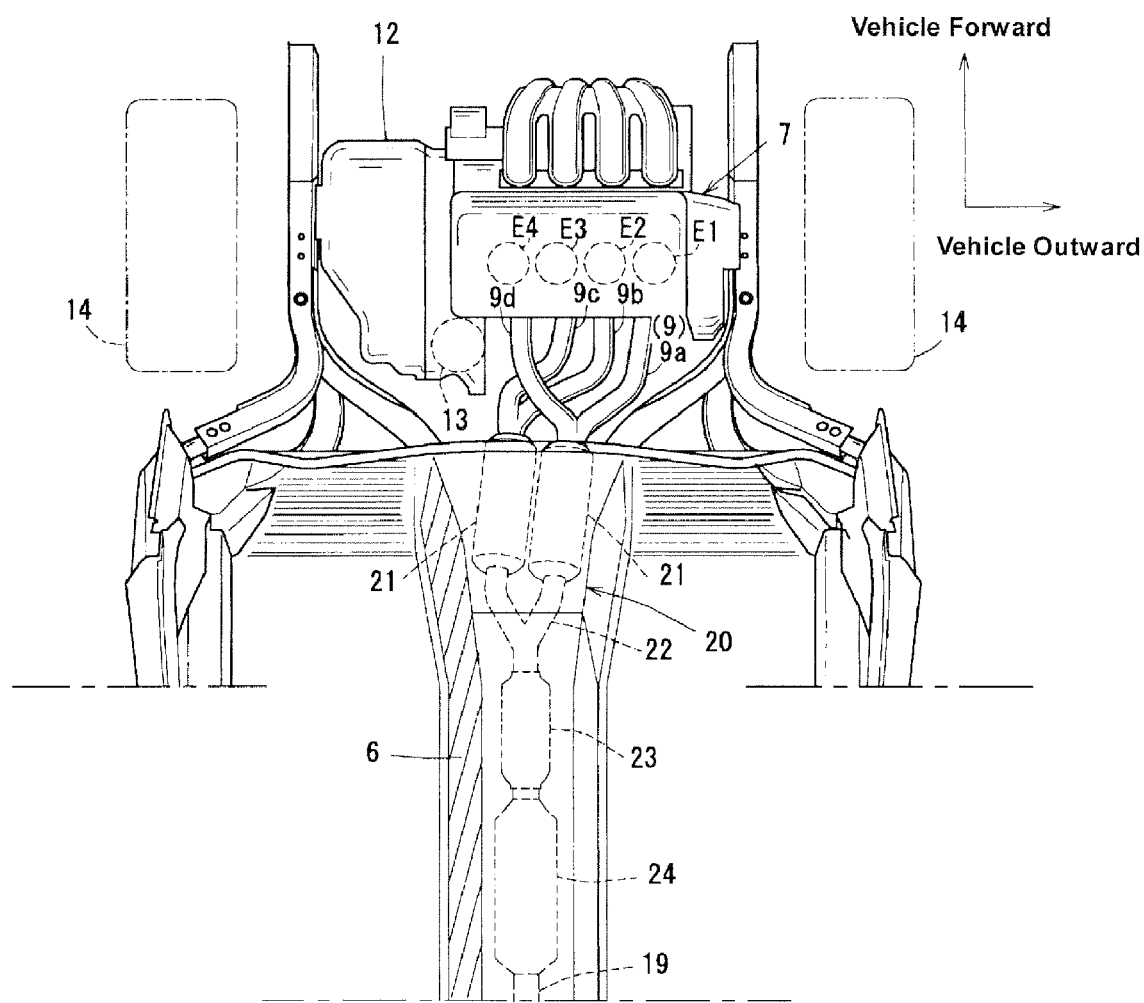
Figure 5:
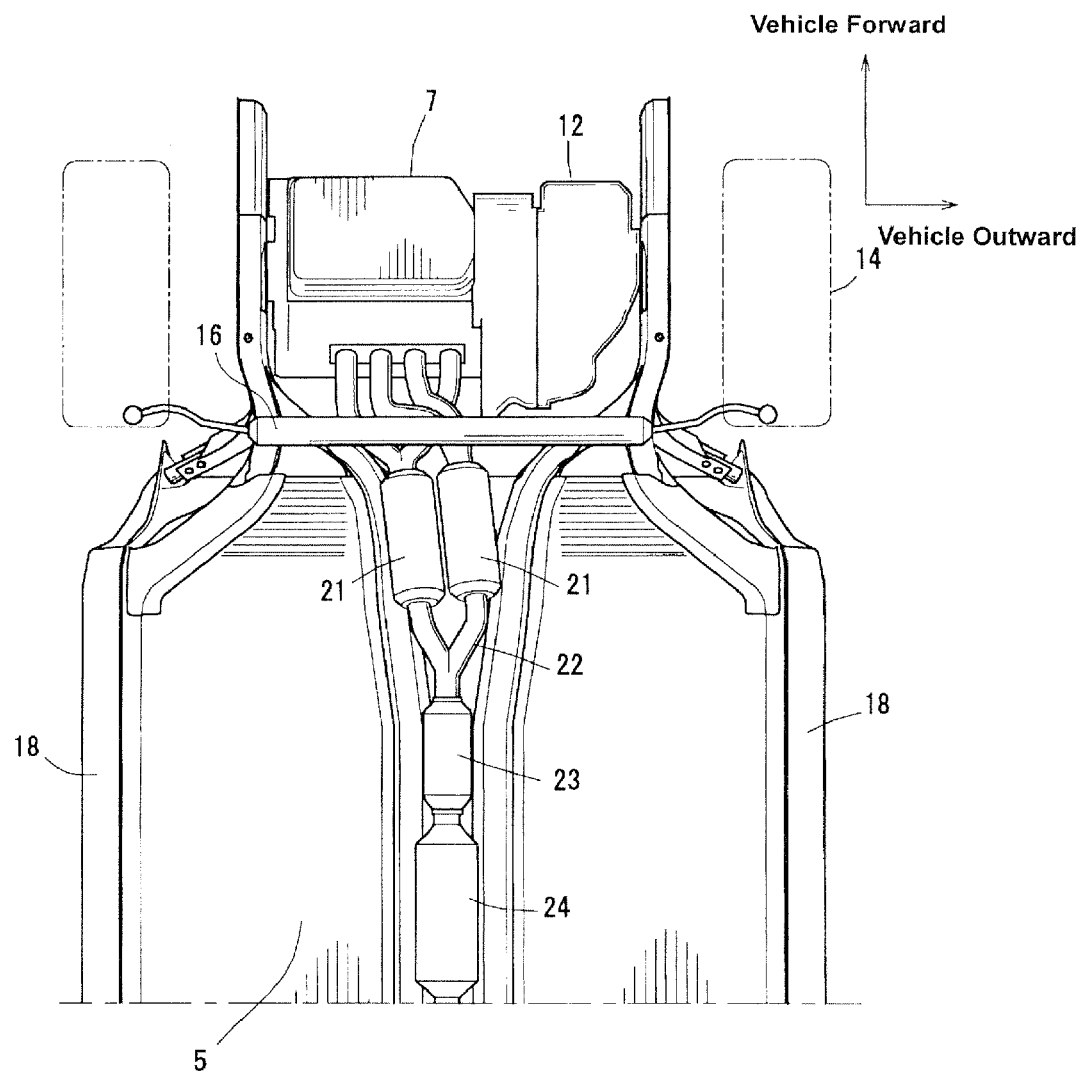

First, an entire structure of a front structure of a vehicle according to a first embodiment will described referring to FIGS. 1-5. FIG. 1 is a perspective view showing a characteristic part of the front structure of the vehicle. FIG. 2 is an entire side view of the front structure of the vehicle. FIG. 3 is an entire elevation view, excluding an engine. FIG. 4 is an entire plan view, including vehicle-body frames and the like. FIG. 5 is an entire bottom view, including the vehicle-body frames and the like.

The front portion of the vehicle, as shown in FIG. 2, comprises an engine room ER in which an engine 7 is disposed, and a vehicle compartment CR that is provided behind the engine room.

The engine room ER is partitioned by a hood 1 at the top that is provided so as to extend longitudinally with its front portion lowering, by a front grille 2 and a front bumper 3 at the front that are positioned at different levels, and by a dash panel 4 that is provided so as to extend vertically and the like at the rear.

The vehicle compartment CR is partitioned by a roof panel, not illustrated, at the top, by the dash panel 4 at the front, and by a floor panel 5 and a tunnel portion 6 that are provided so as to extend longitudinally.

The in-line four-cylinder engine 7 is disposed laterally in the engine room ER. Namely, the engine 7 is disposed in such a manner that its cylinder line extends in a vehicle width direction (laterally). And, the engine 7 is provided slant in such a manner that its upper portion 7a is located slightly rearward. This slant angle α is set to be about 15 degrees.

An intake manifold 8 to introduce air into each cylinder is disposed in front of the engine upper portion 7a, and an exhaust manifold 9 to discharge exhaust gas from each cylinder is disposed in back of the engine upper portion 7a.

The intake manifold 8 is formed in a curve shape so as to surround a surge tank 10 that is provided so as to extend in a direction of the cylinder line, which ensures a specified intake-passage length.

Meanwhile, the exhaust manifold 9 is disposed in back of the engine 7 so as to extend downward and rearward straightly from an exhaust port 11 provided at the engine upper portion 7a of the engine.

A transmission 12 is disposed on one side (the left side in FIG. 4) of the engine 7 as shown in FIG. 4. A front differential 13 is disposed at a rear portion of the transmission 12.

The transmission 12 is a so-called lateral-disposition type of transmission in which its input shaft and output shaft, not illustrated, extend in the vehicle width direction. The transmission 12 transmits an output of the engine to the front differential 13 via helical gears (spur gears) without a direction changing.

The front differential 13 is configured to transmit an output of the transmission 12 to both front wheels 14, 14, and determines an output position of a drive shaft, not illustrated. The drive shaft is provided so as to extend in the vehicle width direction and transmits a drive force to the front wheels 14, 14. Herein, as shown in FIG. 2, a radiator 15 is disposed in front of the engine 7 at a front portion of the engine room ER, and a steering rack 16 of a steering mechanism to steer the front wheels 14 is disposed in back of an engine lower portion 7b.

The dash panel 4 forming a front wall of the vehicle compartment is comprised of a panel member that extends vertically and laterally as shown in FIG. 3. A tunnel opening portion 17 is formed at the center of the dash panel 4 in the vehicle width direction so as to connect to the tunnel portion 6.

The floor panel 5 forming a bottom floor of the vehicle compartment is provided so as to extend rearward from a lower end of the dash panel 4 and in the vehicle width direction as shown in FIG. 1. At both-side ends of the floor panel 5 is provided a pair of side sills 18, 18 as a vehicle-body frame member, that extends longitudinally (see FIG. 5).

At a center of the floor panel 5 in the vehicle width direction is provided the tunnel portion 6 that projects upward (toward an inside of the vehicle compartment) in a hat shape and extends in the vehicle longitudinal direction as shown in FIG. 1. The width W and the height H of the tunnel portion 6 are set to have proper values so that a single exhaust pipe (a rear exhaust pipe 19) can be disposed inside the tunnel portion 6 (vehicle outside).

A tunnel-expansion portion 20 is provided at a front portion of the tunnel portion 6 so as to further project upward and widely in the vehicle width direction. The tunnel-expansion portion 20 is formed so as to allow an inside layout of components of an exhaust system that extends rearward from the exhaust manifold 9 therein.

That is, the tunnel-expansion portion 20 includes an upper-wall face 20a that extends slant rearward from the upper portion of the dash panel 4, corresponding to a specified grade of the exhaust manifold 9, and side-wall faces 20b, 20c that have a width corresponding to the exhaust manifold 9 having four branches and extend in an oblique shape respectively in such a manner that the distance of a front-side portion thereof is wider. Thus, an inner space S is enlarged by the tunnel-expansion portion 20, in which the components of the exhaust system, such as two direct catalysts 21, 21 and a Y-shaped exhaust pipe 22, which are disposed in back of the exhaust manifold 9 are located.

The components of the exhaust system will be described in detailed. As shown in FIG. 4, the exhaust manifold 9 (9a, 9b, 9c, 9d) is disposed in back of the engine 7. The exhaust manifold 9 is configured so that its four branches 9a, 9b, 9c, 9d are collected to two branches once. That is, since a combustion timing of the engine is set in the order of a first cylinder E1→a third cylinder E3→a fourth cylinder E4→a second cylinder E2, the branches 9a, 9d of the first and second cylinders E1, E4, which are located at the both sides, are collected, while the branches 9b, 9c of the second and third cylinders E2, E3, which are located at the central side, are collected.

Two catalysts 21, 21 that have a substantially cylindrical shape are provided side by side in the vehicle width direction corresponding to the above-described collection of the branches 9a, 9b, 9c, 9d. The catalysts 21, which are comprised of a three-way catalyst to purify HC and CO primarily at a cold engine operation, are disposed at this location near the engine.

The Y-shaped exhaust pipe 22 that has a substantially Y shape to collect two passages into one is provided downstream. Since the exhaust gas flowing down through the catalyst 21 may not be influenced by an exhaust interference very much, the exhaust system is configured so that the exhaust pipes are collected into the one passage at this point eventually.

A flexible joint 23 that has a substantially cylindrical shape is provided further downstream to absorb vibrations of the engine, such as rolling. Thus, this exhaust system including the flexible joint 23 is supposed to move along with the engine 7.

A under-foot catalyst 24 that has a substantially cylindrical shape is provided downstream of the flexible joint 23. This catalyst 24, which is also comprised of a three-way catalyst, is disposed at this location to purify NOx primarily.

A single rear exhaust pipe 19 is provided further downstream so as to extend rearward inside the tunnel portion 6. At the end of this exhaust pipe 19 is provided a silencer, not illustrated, and the exhaust gas is discharged rearward of the vehicle finally.

The catalysts 21 and the Y-shaped pipe 22 of the exhaust system are disposed inside the tunnel-expansion portion 20 at the font of the tunnel portion 6 as shown in FIG. 4.

This is because the catalysts 21 and the Y-shaped pipe 22 are disposed so as to extend slant downward in accordance with the substantially straight-extending layout of the exhaust manifold 9 from the exhaust port 11 at the engine upper portion 7a in the side view, as described above.

Thus, the exhaust efficiency of the engine 7 can be improved by the substantially straight-extending layout of the exhaust system.

Accordingly, the substantially straight-extending layout of the exhaust system can be properly achieved by providing the tunnel-expansion portion 20 at the front portion of the tunnel portion 6.

Figure 6:
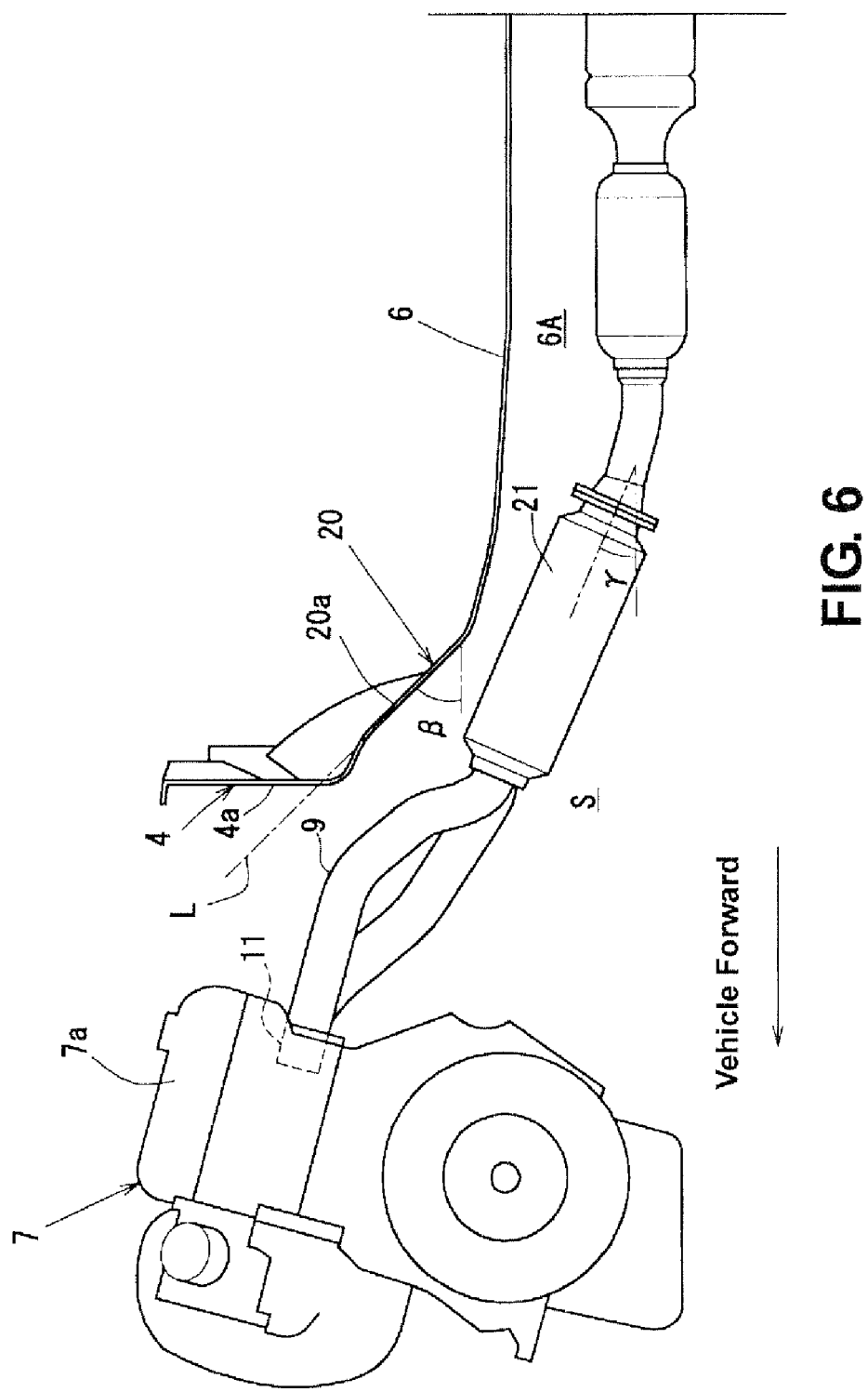
FIG. 6 is a detailed side sectional view of the vicinity of a tunnel-expansion portion.
Figure 7:
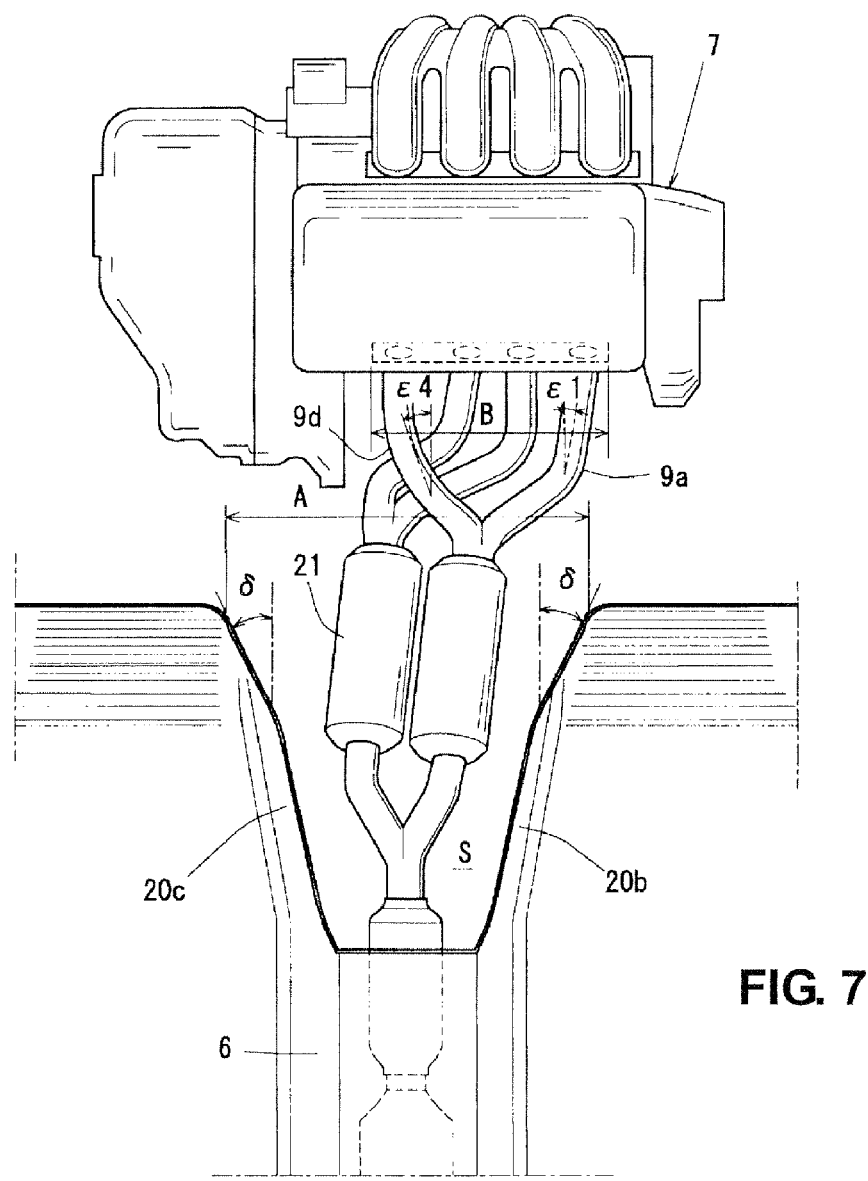
FIG. 7 is a detailed plan sectional view of the vicinity of the tunnel-expansion portion.

The position relationship between the tunnel-expansion portion and the exhaust system will be described specifically referring to FIGS. 6 and 7. FIG. 6 is a detailed side sectional view of the vicinity of the tunnel-expansion portion. FIG. 7 is a detailed plan sectional view of the vicinity of the tunnel-expansion portion.

The upper-wall face 20a of the tunnel-expansion portion 20 is formed so as to have a slant with a specified slant angle β (e.g., β=46 degrees) as shown in FIG. 6. This slant angle β is greater than a slant angle γ (e.g., γ=23 degrees) of the catalyst 21. This is to make the exhaust system move into the tunnel portion 6 properly (smoothly) with guidance of the upper-wall face 20a at the vehicle crash, which will be described later.

Further, the engine 7 and the exhaust port 11 are located below an extension line L of the slant of the upper-wall face 20a. This is to guide the exhaust manifold 9 into a space 6A of the tunnel portion 6 smoothly at the vehicle crash and also to provide the straight-extending layout of the components of the exhaust system properly.

Meanwhile, as shown in FIG. 7, the side-wall faces 20b, 20c of the tunnel portion 6 are formed in an oblique shape respectively in such a manner that the distance of a front-side portion thereof is wider.

The side-wall faces 20b, 20c are provided obliquely with a specified oblique angle δ (e.g., δ=26 degrees). The oblique angle δ is configured to be greater than oblique angles ε1, ε4 (e.g., ε1=10 degrees, ε4=20 degrees) of the exhaust branches 9a, 9d of the first and forth cylinders E1, E4.

The distance A at a front end portion of the side-wall faces 20b, 20c in the vehicle width direction is configured to be greater than the width of the exhaust manifold 9.

This is to guide the exhaust manifold 9 into the inner space S of the tunnel-expansion portion 20 smoothly at the vehicle crash.

A movement at the vehicle crash will be described referring to FIGS. 8 and 9.

Figure 8A:
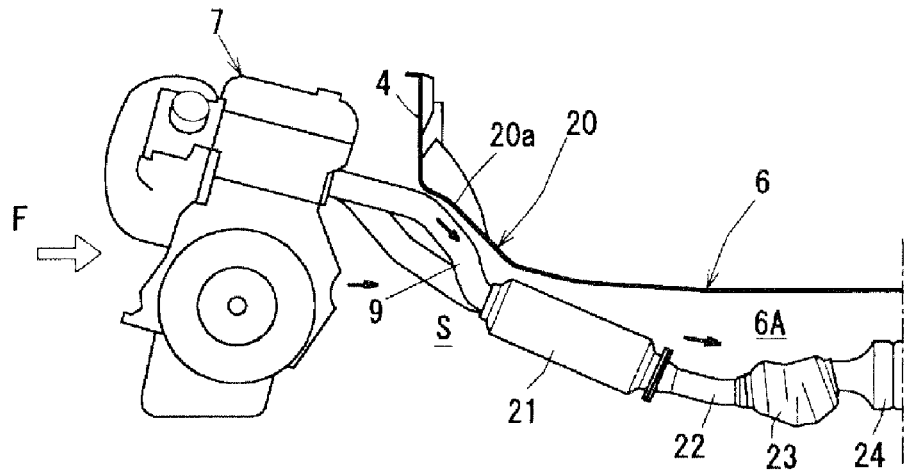
FIGS. 8A, 8B, 8C are explanatory diagrams showing a movement state at a vehicle crash in a side view.
Figure 8B:
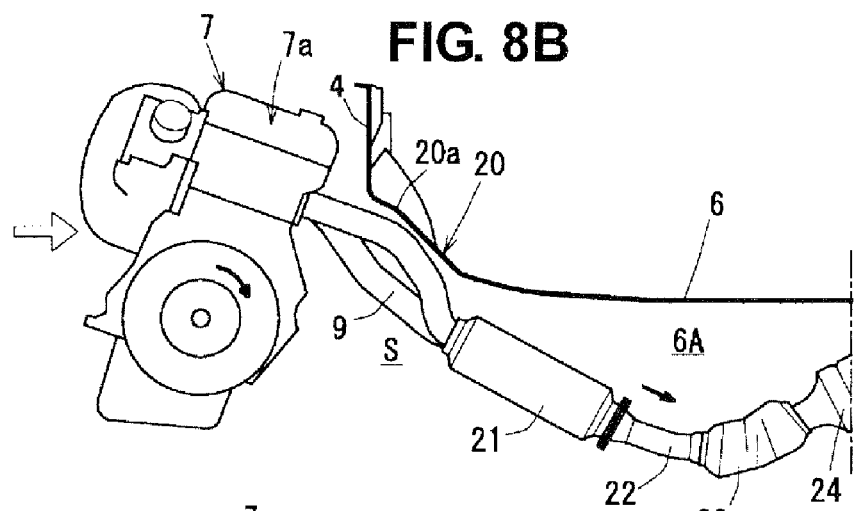
Figure 8C:
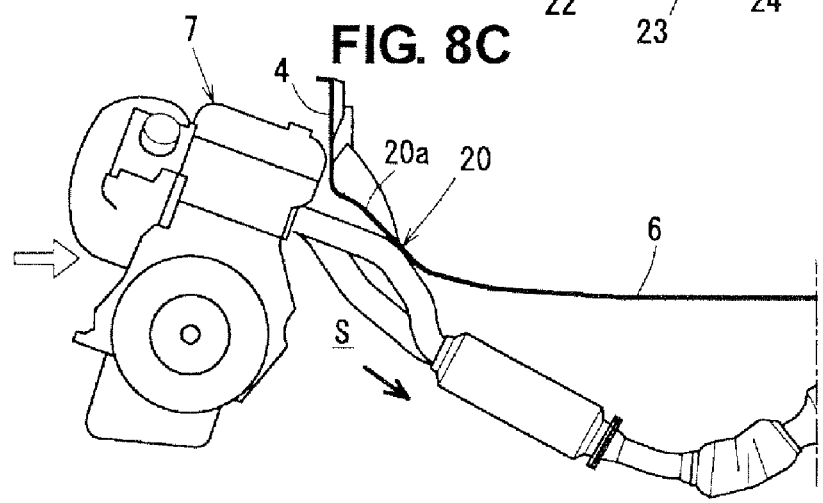
Figure 9A:
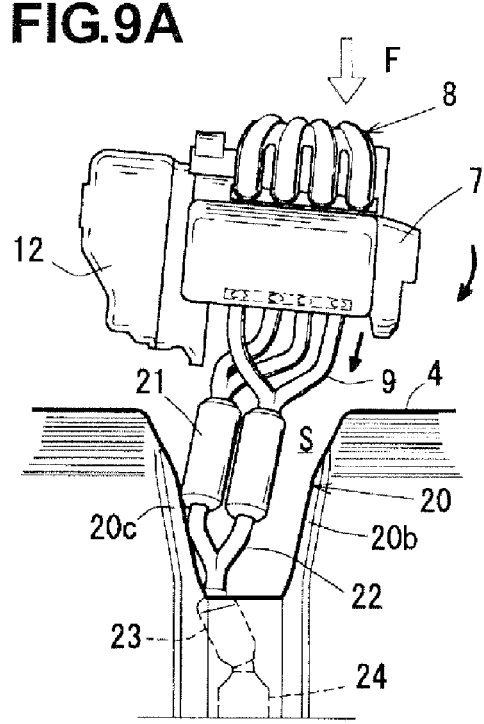
FIGS. 9A, 9B are explanatory diagrams showing a movement state at the vehicle crash in a plan view.
Figure 9B:
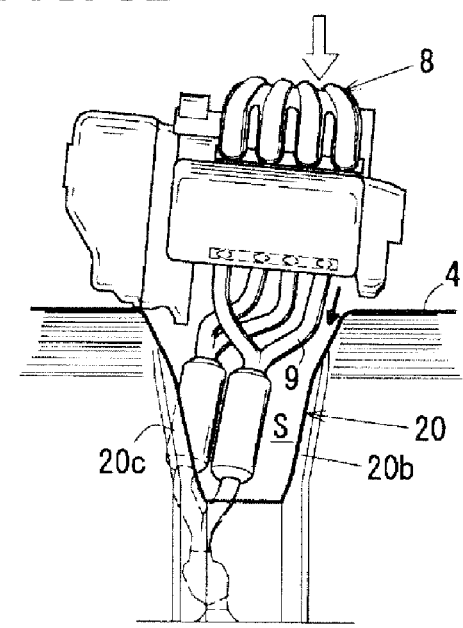

FIG. 8A, 8B, 8C are explanatory diagrams showing the movement state at the vehicle crash in the side view, FIG. 8A shows the one in an initial stage; FIG. 8B shows the one in a middle stage; and FIG. 8C shows the one in a latter stage. FIG. 9A, 9B are explanatory diagrams showing a movement state at the vehicle crash in a plan view, FIG. 9A shows the one in an initial stage; and FIG. 9B shows the one in a latter stage.

When a crash load F acts as shown in FIG. 8a, the engine 7 and the exhaust manifold 9 retreat. Herein, since the upper-wall face 20a of the tunnel-expansion portion 20 has the slant, the components (9, 21, 22, 23, 24) of the exhaust system is guided downward with the exhaust manifold 9 and the like that contact the upper-wall face 20a. At this point, the flexible joint 23 bends because of its flexibility, so that the components (9, 21, 22, 23, 24) of the exhaust system can smoothly move into the spaces S, 6A of the tunnel-expansion portion 20 and the tunnel portion 6.

When the time has passed to the middle stage shown in FIG. 8B, the manifold 9 is guided downward by the upper-wall face 20a. Thereby, the upper portion 7a of the engine 7 becomes further slant, so that the components (9, 21, 22, 23, 24) of the exhaust system can move inside the tunnel-expansion portion 20 and the tunnel portion 6 further smoothly.

Then, when the time has passed to the latter stage shown in FIG. 8C, the components (9, 21, 22, 23, 24) of the exhaust system move into the tunnel-expansion portion 20 and the tunnel portion 6 almost entirely. Thus, the dash panel 4 is not improperly influenced by the components (9, 21, 22, 23, 24) of the exhaust system.

At the vehicle crash, as shown in FIG. 9A, since the intake manifold 8 is located in front of the transmission 12, the engine 7 retreats smoothly. At the initial stage of the vehicle crash, the engine 7 retreats, rotating in a certain direction (clockwise in FIG. 9A). Thereby, the location of the exhaust manifold 9 is changed toward the central side in the vehicle width direction, so that the exhaust system can smoothly movie into the inner space S of the tunnel-expansion portion 20.

Further, since the catalysts 21 are provided at the collection portion of the exhaust manifold 9 and the catalyst 21 is disposed inside the tunnel-expansion portion 20 as described above, the guidance of the exhaust manifold 9 with the four branches moving inside the tunnel-expansion portion 20 can be achieved surely.

Also, since the side-wall faces 20b, 20c are disposed in the oblique shape respectively in such a manner that the distance of the front-side portion thereof is wider, the exhaust manifold 9 contacts the side-wall faces 20b, 20c smoothly in accordance with the retreat of the engine, so that the components (9, 21, 22, 23, 24) of the exhaust system can move into the tunnel-expansion portion 20 more smoothly.

In the latter stage shown in FIG. 9B, the exhaust system retreats so as to move into the tunnel-expansion portion 20 and the tunnel portion 6 almost entirely. Accordingly, the components (9, 21, 22, 23, 24) of the exhaust system may not influence the dash panel 4 improperly even in the vehicle width direction.

Hereinafter, the operation and effects of the present embodiment will be described.

In the front structure of a vehicle of the present embodiment, the components (9, 21) of the exhaust system are disposed in back of the engine so as to extend downward and rearward from the exhaust port 11 of the engine upper portion 7a with the specified slant angle γ, the tunnel portion 6 is provided at the center, in the vehicle width direction, of the connection portion between the dash panel 4 and the floor panel 5, the tunnel portion 6 being configured to project toward the inside of the vehicle compartment and extend in the vehicle longitudinal direction, and the tunnel-expansion portion 20 is provided at the front portion of the tunnel portion 6. Herein, the tunnel-expansion portion 20 is configured to project upward greatly along the components of the exhaust system, and the tunnel-expansion portion 20 includes the upper-wall face 20a that has the slant (the slant angle β) that corresponds to the specified slant angle γ of the exhaust component (21).

Thereby, the components (9, 21) of the exhaust system extending downward and rearward can be provided inside (below) the tunnel-expansion portion 20. Thus, the components (9, 21) of the exhaust system can be disposed in back of the engine 7 without bending improperly, with the engine 7 located near the dash panel 4. Further, the components of the exhaust system can be located inside the tunnel-expansion portion 20 properly, so they can be made move inside the tunnel portion 6 properly and smoothly at the vehicle crash. Accordingly, in the front structure of the vehicle, in which the engine 7 is laterally disposed in the engine room ER at the front portion of the vehicle, the intake manifold 8 is disposed in front of the engine 7, and the exhaust manifold 9 is disposed in back of the engine 7, the exhaust efficiency of the engine 7 and the vehicle safety against the vehicle crash can be improved, without providing an improperly-large longitudinal space between the engine 7 and the dash panel 4.

Further, according to the present embodiment, the engine 7 and the exhaust port 11 of the engine 7 are provided so as to be located below the extension line L of the slant angle β of the upper-wall face 20a of the tunnel-expansion portion 20 (see FIG. 6). Thereby, the straight-extending layout of the components (9, 21) of the exhaust system can be achieved more surely. Further, the guidance of the components (9, 21) of the exhaust system into the inner spaces S, 6A of the tunnel-expansion portion 20 and the tunnel portion 6 can be achieved more properly. Thus, the exhaust efficiency of the engine 7 can be more improved, and the improper influence of the components (9, 21) of the exhaust system to the dash panel 4 at the vehicle crash can be prevented surely.

Also, according to the present embodiment, the exhaust pipe 9 is comprised of a plurality of branches 9a, 9b . . . that are located substantially side by side in the vehicle width direction, and the tunnel-expansion portion 20 has the side-wall faces 20b, 20c that are away from each other with the specified distance A in the vehicle width direction that is greater than the width B of the exhaust manifold 9. Thereby, all of the plurality of exhaust branches 9a, 9b . . . can be made move into the side-wall faces 20b, 20c of the tunnel-expansion portion 20 when the engine 7 retreats (is pushed rearward) at the vehicle crash. Thus, the exhaust manifold 9 moves into the inner space S of the tunnel-expansion portion 20 entirely, so that the pushing back of the dash panel 4 by the exhaust manifold 9 can be prevented.

Further, according to the present embodiment, the side-wall faces 20b, 20c of the tunnel-expansion portion 20 are disposed in the oblique shape respectively in such a manner that the distance of its front-side portion is wider, and the oblique angle δ of the side-wall faces 20b, 20c of the tunnel-expansion portion 20 is configured to be greater than the oblique angles ε1, ε4 of the exhaust branches 9a, 9d located at both-side ends of the exhaust manifold 9 that are provided obliquely so as to extend inwardly. Thereby, the exhaust branches 9a, 9d of the exhaust manifold 9 moving into the tunnel-expansion portion 20 can be properly guided by the both side-wall faces 20b, 20c. Thus, the exhaust manifold 9 can smoothly move into the inner space S of the tunnel-expansion portion 20, so that the safety at the vehicle crash can be improved.

Also, according to the present embodiment, the catalyst 21 as the collective exhaust pipe is provided in back of the exhaust manifold 9, and the catalyst 21 is disposed at the location that corresponds to the tunnel-expansion portion 20. Thereby, all of the plurality of exhaust branches 9a, 9b . . . can be made move into the inner space S of the tunnel-expansion portion 20 at the vehicle crash. Accordingly, the safety at the vehicle crash can be improved.

Further, according to the present embodiment, the catalysts 21 are provided at the location that corresponds to the tunnel-expansion portion 20. Thereby, the catalysts 21 can be disposed by using a relatively large space inside the tunnel-expansion portion 20. Thus, there is no need of providing a space between the engine 7 and the dash panel 4 for the catalysts 21, so that the safety of the vehicle against the vehicle crash can be further improved. In particular, air (heat) around the catalyst 21 heated can be properly discharged toward the rear of the vehicle by utilizing the tunnel portion 6 extending longitudinally. Accordingly, a heat damage caused by the catalysts 21 can be properly prevented.

Also, the flexible joint 23 is provided downstream of the catalyst 21 in the present embodiment. Thereby, the exhaust system can be promoted to bend downward, so that it can move into the tunnel-expansion portion 20 more smoothly.

Further, according to the present embodiment, the steering rack 16 to steer front wheels is disposed in front of the catalysts 21 (see FIGS. 2 and 5). Thereby, the heated air by the catalysts 21 can be prevented from flowing down through the steering rack 16. Thus, the heat damage of the steering rack 16 can be avoided, so that the durability of the steering rack 16 can be maintained.

Also, according to the present embodiment, the engine 7 is provided slant in such a manner that the upper portion 7a is located rearward (see FIG. 2). Thereby, there can be provided spaces in front of the engine upper portion 7a and in back of the engine lower portion 7b. Further, the position of the exhaust port 11 of the engine 7 can be lowered. Accordingly, the disposition space of the intake manifold 8 in front of the engine 7 can be enlarged. Also, the front differential 13 disposed behind the engine 7 can be located forward. Further, since the position of the exhaust port 11 of the engine 7 is lowered, the components of the exhaust system can be disposed so as to extend as straightly as possible, thereby improving the exhaust efficiency of the engine 7. In addition, sine the distance to the catalysts 21 can be shortened, the catalysts 21 can be activated quickly. Accordingly, the function of intake and exhaust system of the engine 7 can be improved due to the above-described rearward-slant disposition of the engine 7, and the maneuverability of the vehicle can be improved due to a shortened overhang of the vehicle.

Figure 10:
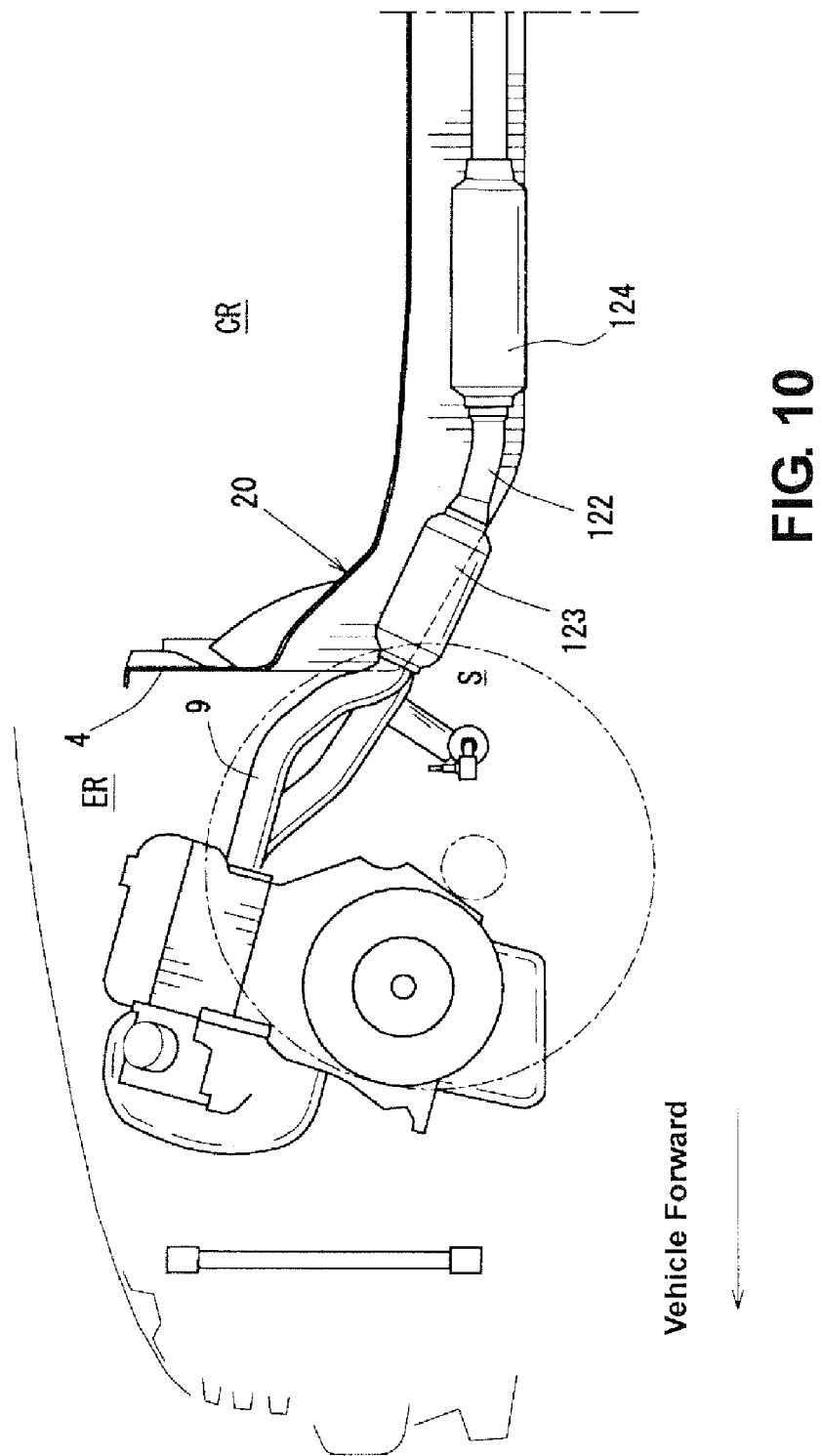
FIG. 10 is an entire side view of a modified front structure of the vehicle.
Figure 11:
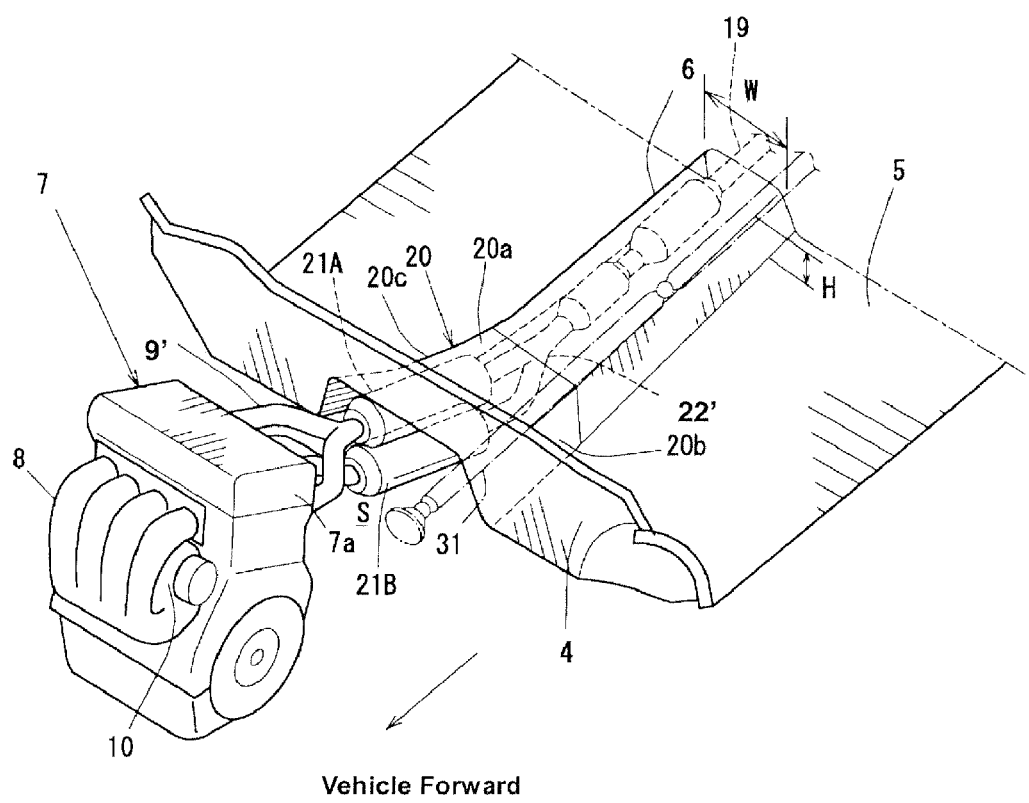
FIG. 11 is a perspective view showing a characteristic part of a front structure of a vehicle according to a second embodiment of the present invention.

Herein, a modified front structure of a vehicle may be considered as shown in FIG. 10. In this modification, flexible joints 123 are disposed right behind the exhaust manifold 9, a collective exhaust pipe 122 is disposed downstream of the flexible joints 123, and then a catalyst 124 is disposed. Herein, the flexible joints 123 are provided inside the tunnel-expansion portion 20.

Accordingly, the layout of the flexible joints 123 can be properly achieved by using the relatively large space (inner space S) inside the tunnel-expansion portion 20 in this modification as well. Particularly, although two flexible joints 123 are disposed side by side because of their layout upstream of the Y-shaped exhaust pipe 122, they can be disposed easily in the relatively large space S of the tunnel-expansion portion 20. Thereby, since there is no need of disposing the two flexible joints 123 between the engine 7 and the dash panel 4, the safety at the vehicle crash can be improved further.

Embodiment 2

A front structure of a vehicle according to a second embodiment will described referring to FIGS. 11-19. The same components as those of the above-described first embodiment are denoted by the same reference characteristics, whose detailed descriptions are omitted here.

In the present embodiment, as shown in FIG. 4, a transfer device 30 is disposed on the other side (on the right side in FIG. 14) of the front differential 13. The transfer device 30 is configured to transmit the drive force to rear wheels (not illustrated) via a propeller shaft 31. The propeller shaft 31 is disposed so as to extend in the vehicle longitudinal direction in the tunnel portion 6 to transmit the drive force to the rear wheels. Thus, both the front wheels 14, 14 and the rear wheels are driven in the four-wheel drive vehicle of the present embodiment.

The width W and the height H of the tunnel portion 6 are set to have proper values so that the single exhaust pipe (the rear exhaust pipe 19) and the propeller shaft 31 can be disposed inside the tunnel portion 6 (vehicle outside).

Like the first embodiment, the tunnel-expansion portion 20 is provided at the front portion of the tunnel portion 6 so as to further project upward and widely in the vehicle width direction. The tunnel-expansion portion 20 is formed so as to allow the inside layout of components of the exhaust system that extends rearward from the exhaust manifold 9' and the propeller 31 therein.

That is, the tunnel-expansion portion 20 includes the upper-wall face 20a that extends slant rearward from the upper portion of the dash panel 4, corresponding to the specified grade of an exhaust manifold 9', and the side-wall faces 20b, 20c that have the width corresponding to the exhaust manifold 9' having four branches and extend in the oblique shape respectively in such a manner that the distance of the front-side portion thereof is wider. Thus, the inner space S is enlarged by the tunnel-expansion portion 20, in which the components of the exhaust system, such as two direct catalysts 21A, 21B and a Y-shaped exhaust pipe 22' and the propeller shaft 31 extending longitudinally are located.

Figure 14:
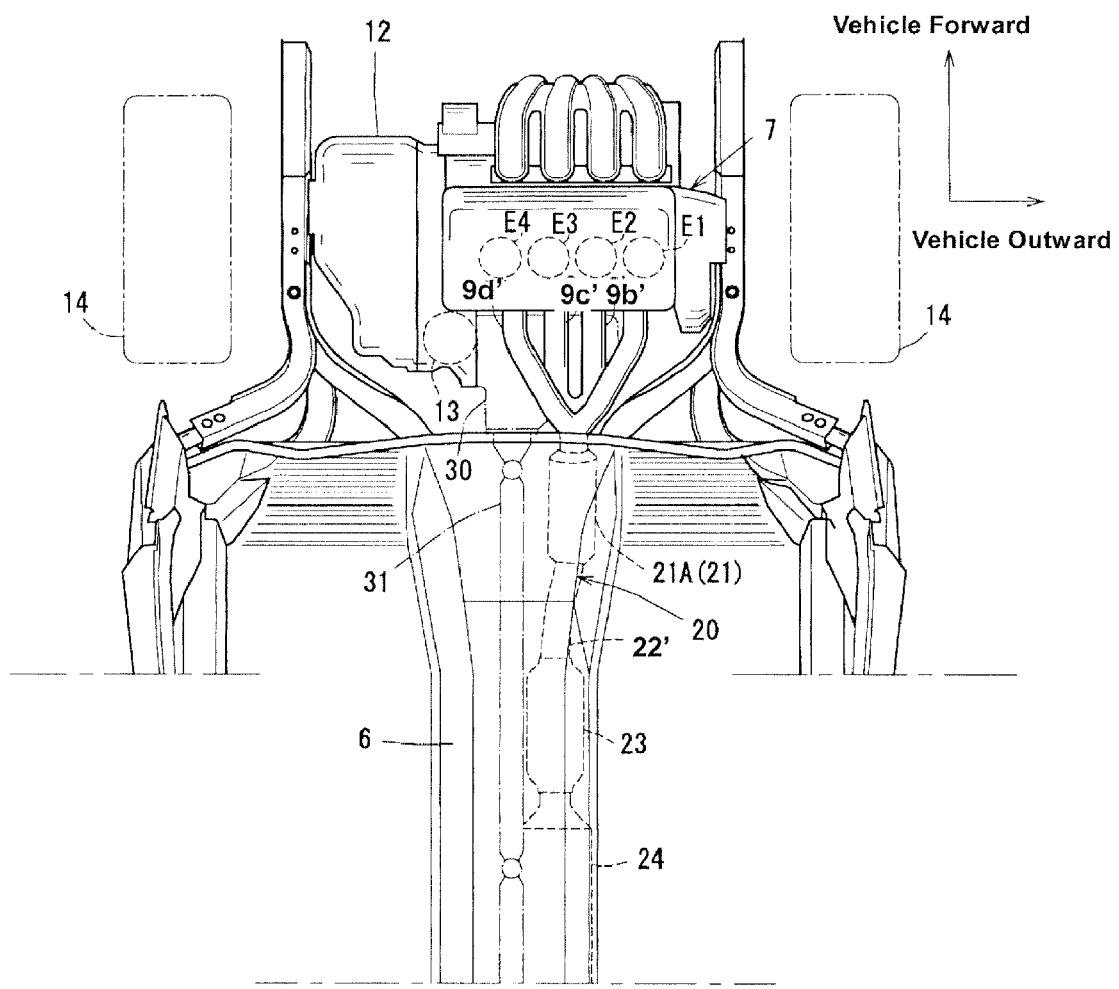
Figure 15:
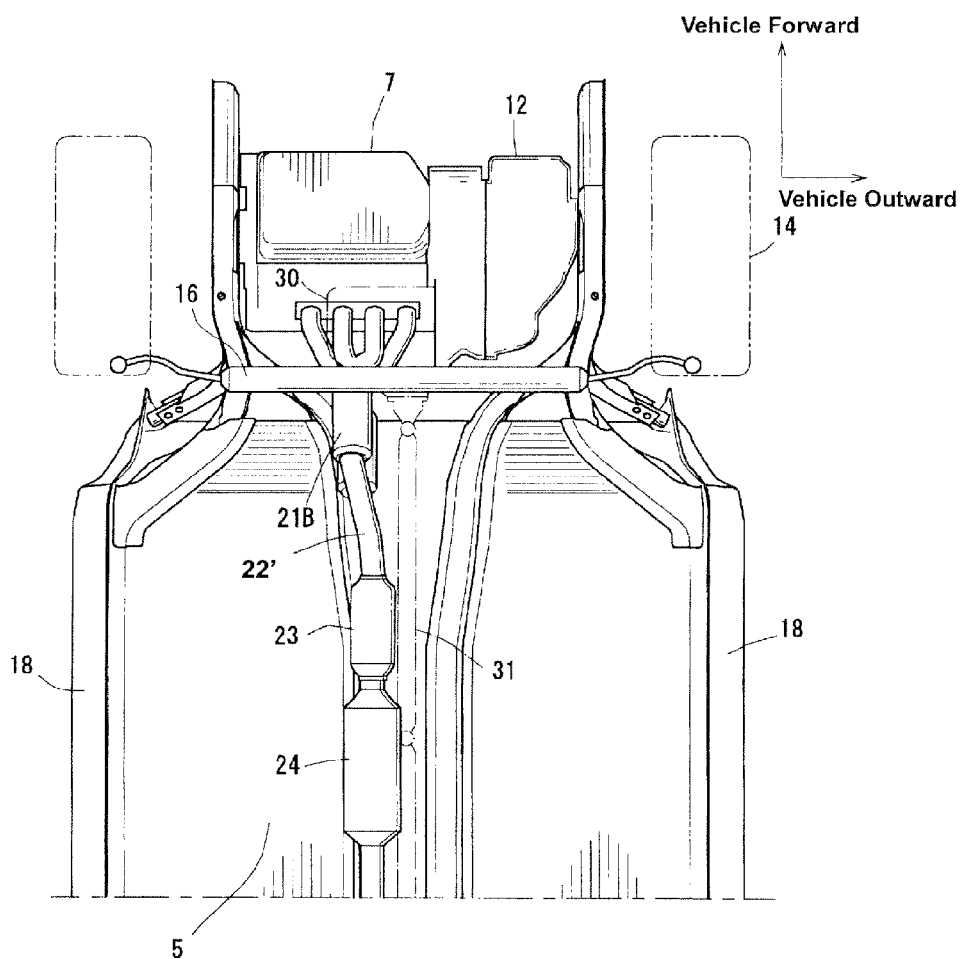

The components of the exhaust system will be described in detailed. As shown in FIG. 14, the exhaust manifold 9' (9a', 9b', 9c', 9d') is disposed in back of the engine 7. The exhaust manifold 9' is configured so that its four branches 9a', 9b', 9c', 9d' are collected to two branches once. That is, since the combustion timing of the engine is set in the order of the first cylinder E1→the third cylinder E3→the fourth cylinder E4→the second cylinder E2, the branches 9a', 9d' of the first and second cylinders E1, E4, which are located at the both sides, are collected, while the branches 9b', 9c' of the second and third cylinders E2, E3, which are located at the central side, are collected.

Figure 12:
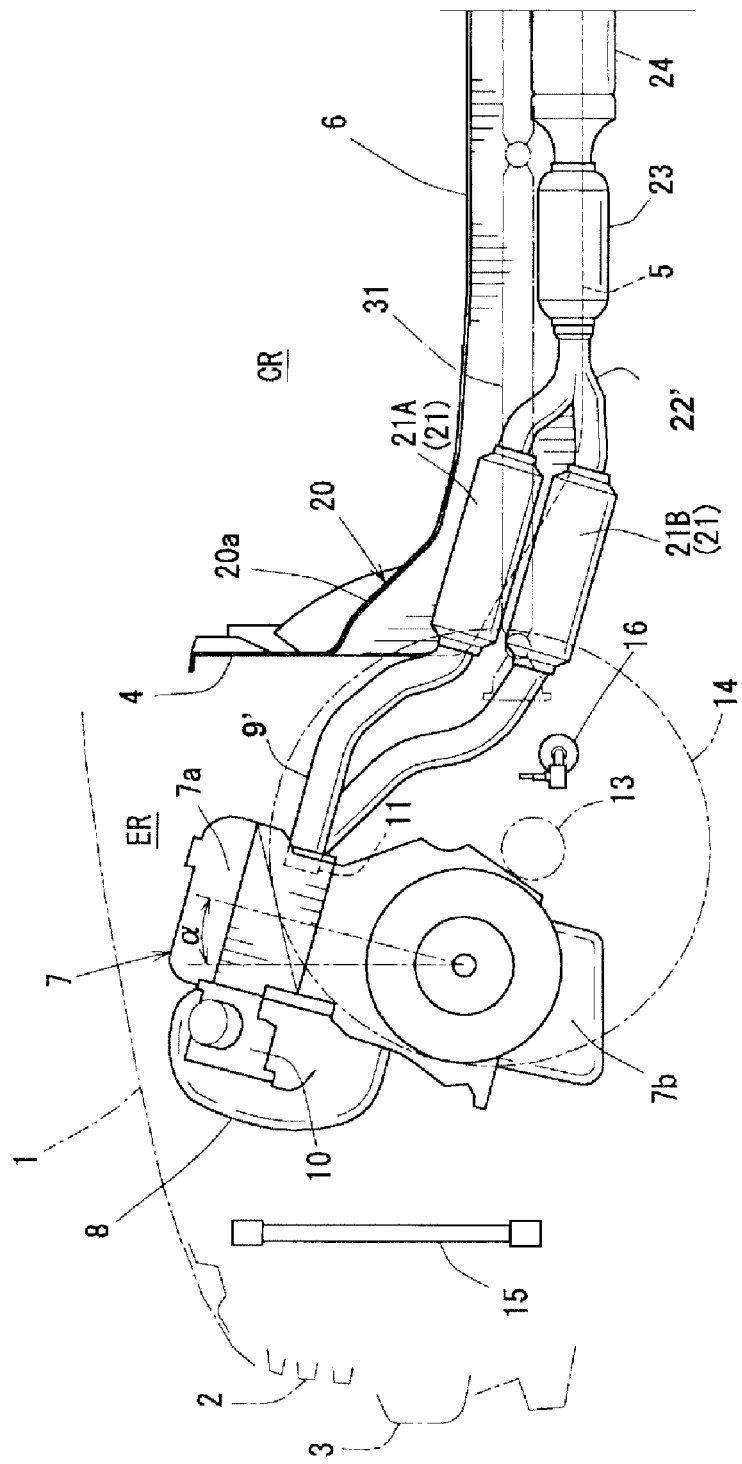
FIG. 12 is an entire side view of the front structure of the vehicle.
Figure 13:
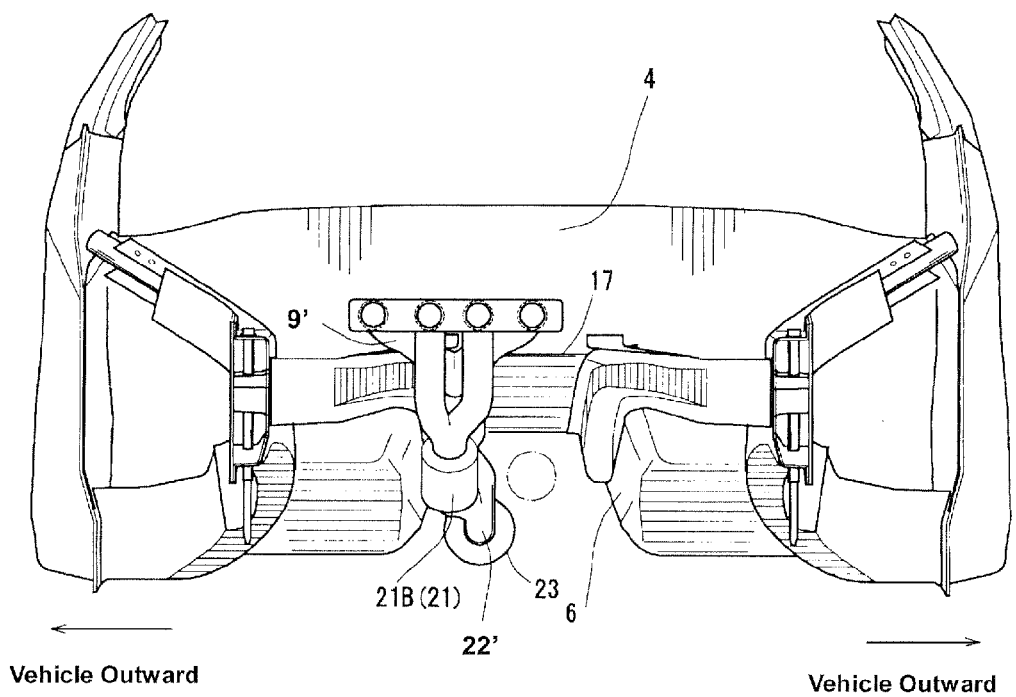
FIG. 13 is an entire elevation view, excluding the engine.

Two catalysts 21A, 21B that have a substantially cylindrical shape are provided side by side in the vertical direction corresponding to the above-described collection of the branches 9a', 9b', 9c', 9d' (see FIG. 12). Specifically, the upper catalyst 21A is provided corresponding to the collective pipe of the branch 9a' of the first cylinder E1 and the branch 9d' of the fourth cylinder 4E, and the lower catalyst 21B is provided corresponding to the collective pipe of the branch 9b' of the second cylinder E2 and the branch 9c' of the third cylinder E3.

Thus, the catalysts 21A, 21B are located up and down corresponding to the respective exhaust branches. Accordingly, the distance from the exhaust port to the catalysts can be shortened, thereby improving the purification function of the catalysts.

The catalysts 21A, 21B, which are comprised of the three-way catalyst to purify HC and CO primarily at the cold engine operation, are disposed at this location.

The Y-shaped exhaust pipe 22' that has the substantially Y shape to collect two passages into one is provided downstream. Since the exhaust gas flowing down through the catalysts 21A, 21B may not be influenced by an exhaust interference very much, the exhaust system is configured so that the exhaust pipes are collected into the one passage at this point eventually.

The catalysts 21A, 21B and the Y-shaped pipe 22' of the exhaust system are disposed inside the tunnel-expansion portion 20 at the font of the tunnel portion 6 as shown in FIG. 14.

Figure 16:
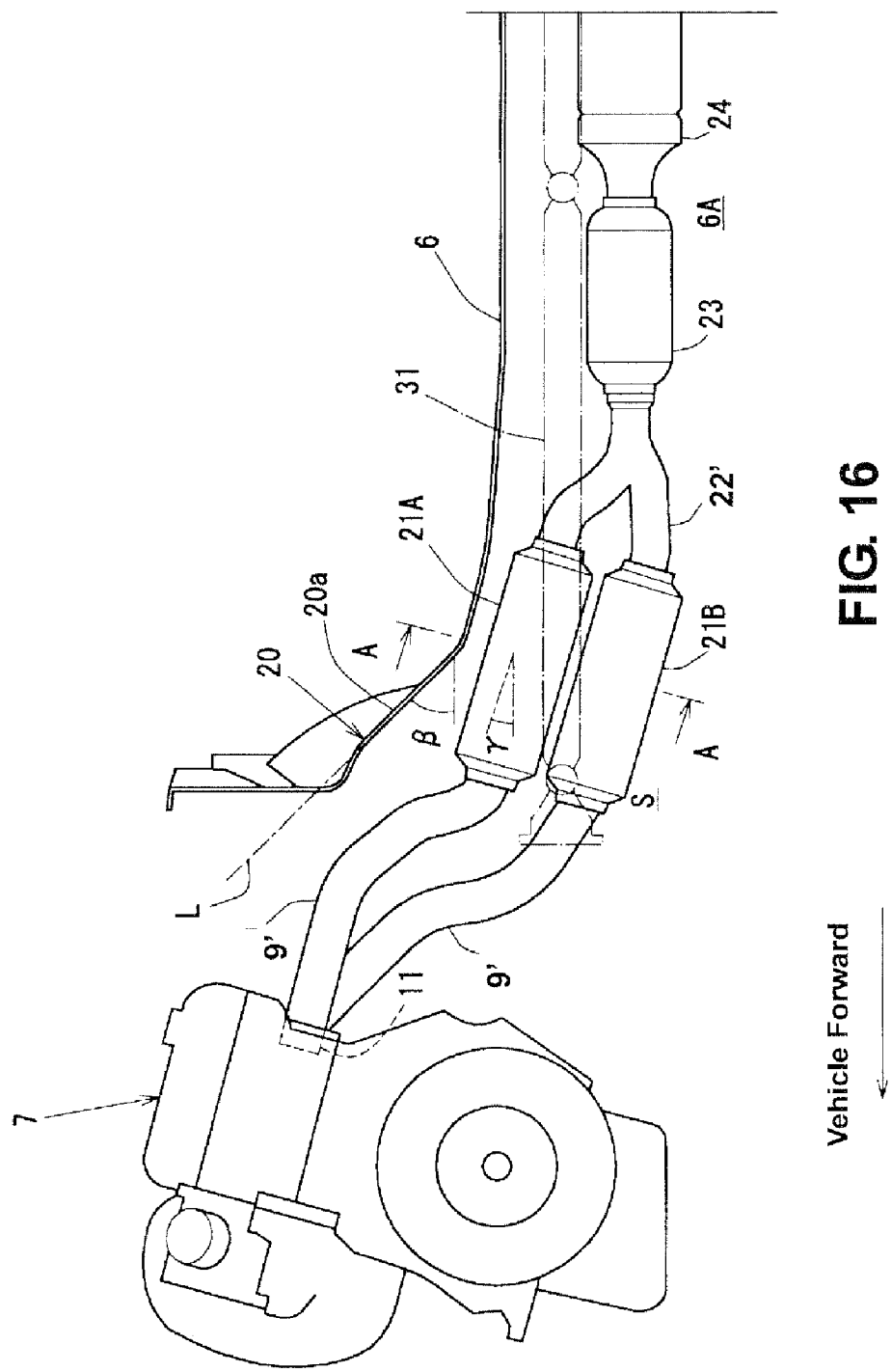
FIG. 16 is a detailed side sectional view of the vicinity of the tunnel-expansion portion.
Figure 17:
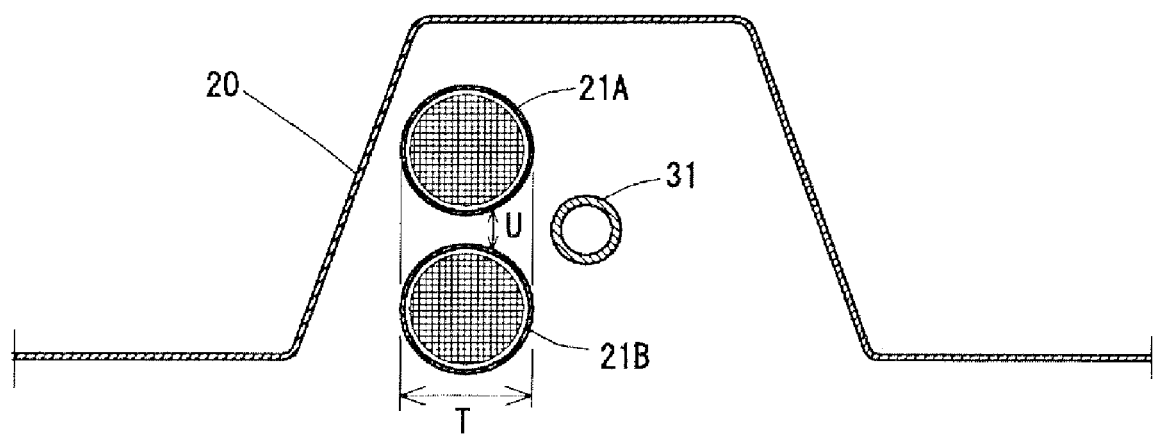
FIG. 17 is a sectional view taken along line of A-A of FIG. 6.

The position relationship between the tunnel-expansion portion 20 and the components of the exhaust system and the propeller shaft 31 will be described specifically referring to FIGS. 16 and 17. FIG. 16 is a detailed side sectional view of the vicinity of the tunnel-expansion portion. FIG. 17 is a sectional view taken along line A-A of FIG. 16.

The upper-wall face 20a of the tunnel-expansion portion 20 is formed so as to have a slant with a specified slant angle β (e.g., β=46 degrees) as shown in FIG. 16. This slant angle β is greater than a slant angle γ (e.g., γ=20 degrees) of the catalysts 21A, 21B. This is to make the exhaust system moves into the tunnel portion 6 properly (smoothly) with guidance of the upper-wall face 20a at the vehicle crash, which will be described later.

Further, the engine 7 and the exhaust port 11 are located below an extension line L of the slant of the upper-wall face 20a. This is to guide the exhaust manifold 9' into the space 6A of the tunnel portion 6 smoothly at the vehicle crash and also to provide the straight-extending layout of the components of the exhaust system properly.

Also, the catalysts 21A, 21B disposed inside the tunnel-expansion portion 20 are provided side by side vertically and extend in the vehicle longitudinal direction. The propeller shaft 31 is disposed beside the catalysts 21A, 21B.

As shown in FIG. 17, the catalyst disposed in the inner space S of the tunnel-expansion portion 20 is configured so that the upper catalyst 21A and the lower catalyst 21B are located to be substantially overlapped in the plan view with an identical width T. This is because these catalysts 21A, 21B are configured to move vertically with the width T of the single catalyst at the vehicle crash, which will be described later.

That is, if the single catalyst has the width T, two catalysts 21A, 21B may move vertically within this width T properly.

Further, the propeller shaft 31 is located beside the catalysts 21A, 21B so as not to restrict their vertical movement. Also, this side location of the catalysts may provide a safety function caused by the propeller shaft 31 itself at the vehicle crash, separately from the components of the exhaust system, such as the catalysts 21A, 21B.

A movement at the vehicle crash will be described referring to FIGS. 18A, 18B, 18C.

Figure 18A:
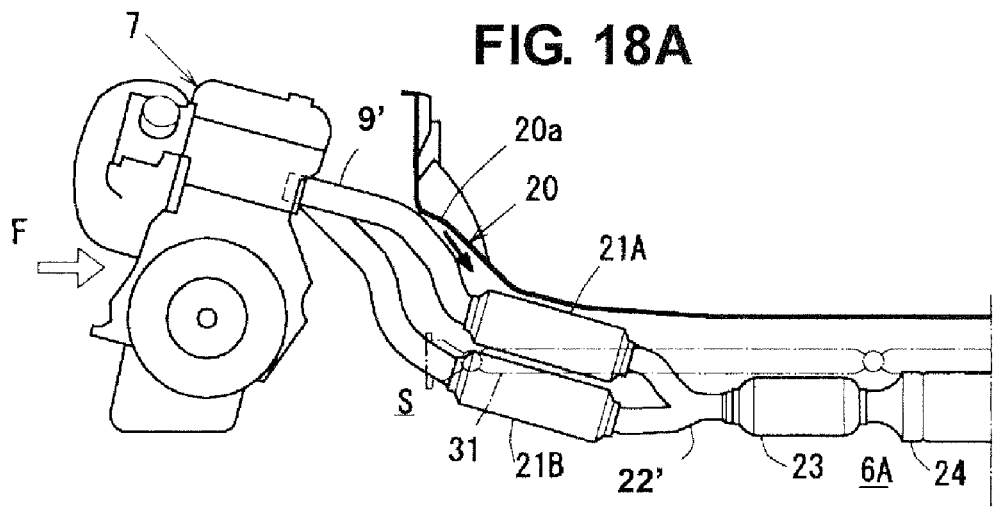
FIGS. 18A, 18B, 18C are explanatory diagrams showing a movement state at the vehicle crash in the side view.
Figure 18B:
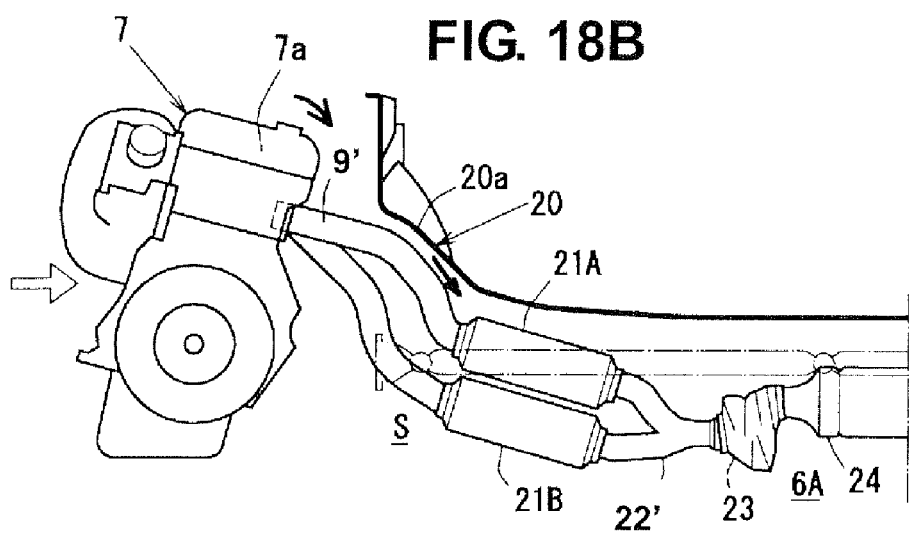
Figure 18C:
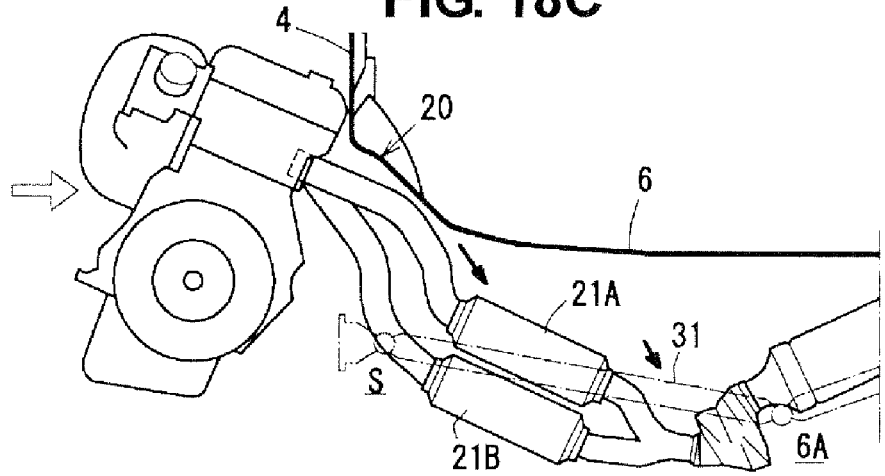

FIGS. 18A, 18B, 18C are explanatory diagrams showing the movement state at the vehicle crash in the side view, FIG. 18A shows the one in an initial stage; FIG. 18B shows the one in a middle stage; and FIG. 18C shows the one in a latter stage.

When a crash load F acts as shown in FIG. 18A, the engine 7 and the exhaust manifold 9' retreat. Herein, since the upper-wall face 20a of the tunnel-expansion portion 20 has the slant, the components (9', 21A, 21B, 22', 23, 24) of the exhaust system is guided downward with the exhaust manifold 9' and the like that contact the upper-wall face 20a.

At this point, since the propeller shaft 31 is located on the side as described above, the components of the exhaust system can be surely guided downward. Also, since they are located side by side vertically, the catalysts 21A, 21B can be guided downward with a narrower space in the vehicle width direction.

When the time has passed to the middle stage shown in FIG. 18B, the flexible joint 23 behind the catalysts 21A, 21B properly bend. Thereby, the components (9', 21A, 21B, 22', 23, 24) of the exhaust system can move into the spaces S, 6A of the tunnel-expansion portion 20 and the tunnel portion 6 further smoothly. Herein, since the exhaust manifold 9' is guided downward by the upper-wall face 20a, the engine 7 can be further rotated in such a manner that the upper portion 7a moves rearward.

Then, when the time has passed to the latter stage shown in FIG. 18C, the components (9', 21A, 21B, 22', 23, 24) of the exhaust system move into the tunnel-expansion portion 20 and the tunnel portion 6 almost entirely. Thus, the dash panel 4 is not improperly influenced by the components (9', 21A, 21B, 22', 23, 24) of the exhaust system.

Further, there is further provided a crash safety mechanism to allow dropping of the propeller shaft 31 at the vehicle crash at a center bearing support, not illustrated, for the propeller shaft 31. Accordingly, since it drops out of the tunnel portion 6 as shown, the propeller shaft 31 may not prevent the engine 7 from retreating, so that the safety of the vehicle can be improved. Herein, the crash safety mechanism of the propeller shaft 31 may be comprised of a collapsible mechanism in which the shaft 31 is shortened by a compressive force that acts in its axial direction.

Thus, since two catalysts 21A, 21B are disposed side by side vertically, the catalysts 21A, 21B and the propeller shaft 31 can be guided or dropped downward without interference with each other surely, thereby further improving the safety at the vehicle crash.

Hereinafter, the operation and effects of the present embodiment will be described.

In the front structure of the vehicle according to the present embodiment, the two catalysts 21A, 21B as the collective pipes of the exhaust manifold 9' are disposed substantially side by side in the vertical direction at the location that corresponds to the tunnel-expansion portion 20. Thereby, the two catalysts 21A, 21b can be located with the narrower space just for the single catalyst in the plan view. Thus, the wide space for the catalysts 21A, 21B moving vertically at the vehicle crash can be properly narrowed in the vehicle width direction.

Further, according to the present embodiment, there is provided the propeller shaft 31 to transmit the drive force of the engine 7 to the rear wheels, and the propeller shaft 31 is disposed on the side of two catalysts 21A, 21B in the vehicle width direction. Thereby, it can be prevented for the propeller shaft 31 to interfere with the catalysts 21A, 21b moving vertically at the vehicle crash. Thus, in a case where the propeller shaft 31 is disposed inside the tunnel-expansion portion 20, the propeller shaft 31 does not improperly influence the components of the exhaust system moving vertically, so that the components (9', 21A, 21B, 22', 23, 24) of the exhaust system moving into the space S of the tunnel-expansion portion 20 can be achieved more surely. Accordingly, the safety of the four-wheel-drive vehicle with the compact tunnel-expansion portion 20 can be improved.

Also, according to the present embodiment, the propeller shaft 31 is positioned at a level that is located substantially between the two catalysts 21A, 21B in the vertical direction thereby, the propeller shaft 31 can be disposed properly near the catalysts 21A. 21B by using a gap U (see FIG. 17) formed between the two catalysts 21A, 21B. Thus, there may be no need of a wide space for the layout of the propeller shaft 31 in the vehicle width direction, so that the tunnel-expansion portion 20 can be made compact properly.

Figure 19:
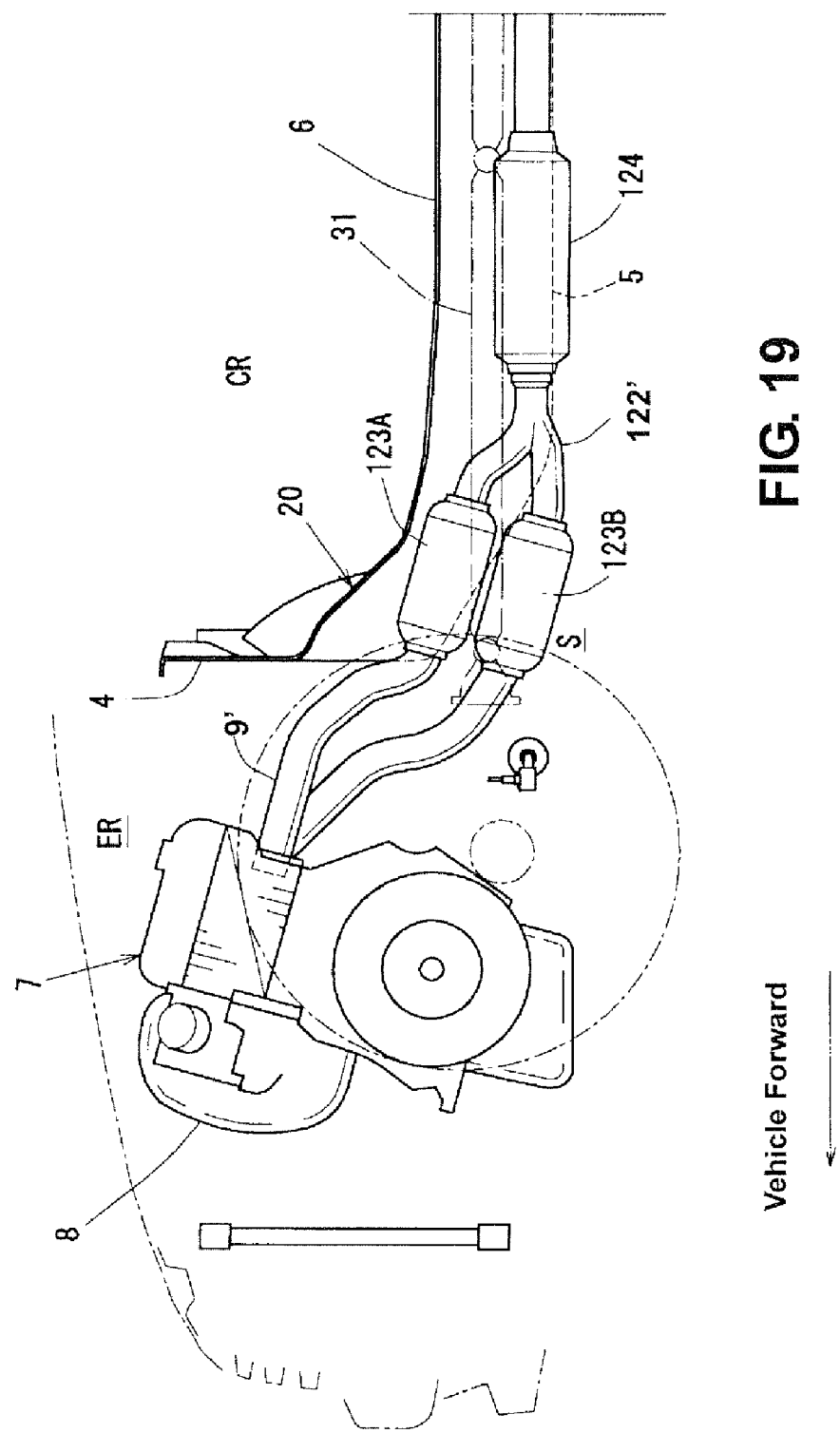
FIG. 19 is an entire side view of another modified front structure of the vehicle.
Figure 20:
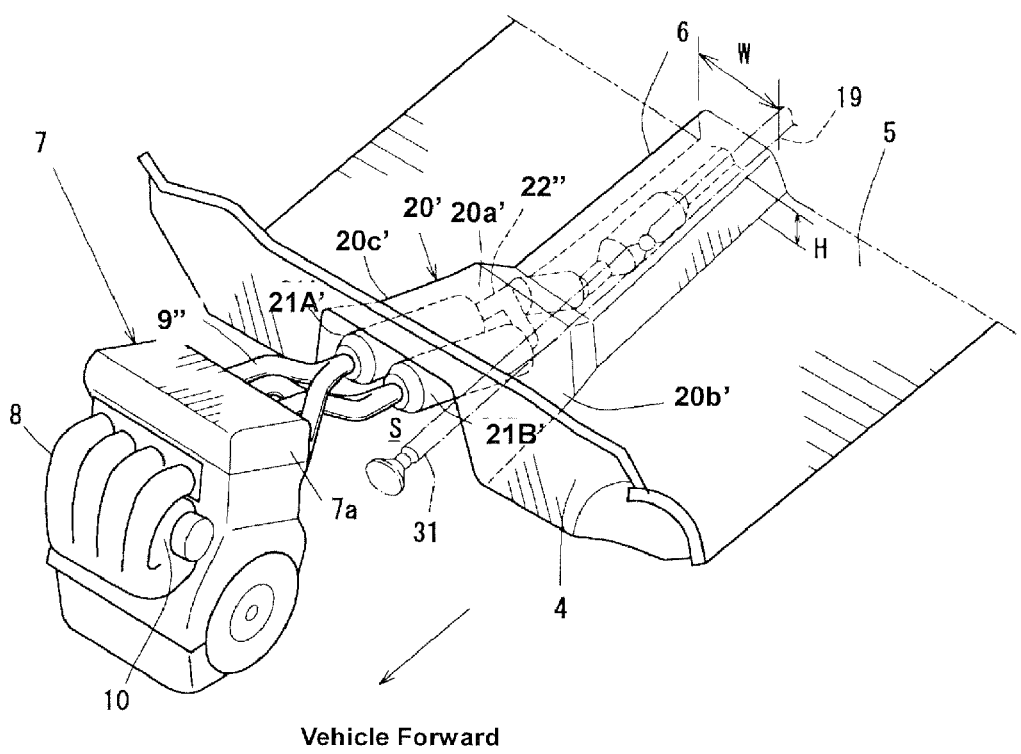
FIG. 20 is a perspective view showing a characteristic part of a front structure of a vehicle according to a third embodiment of the present invention.
Figure 21:
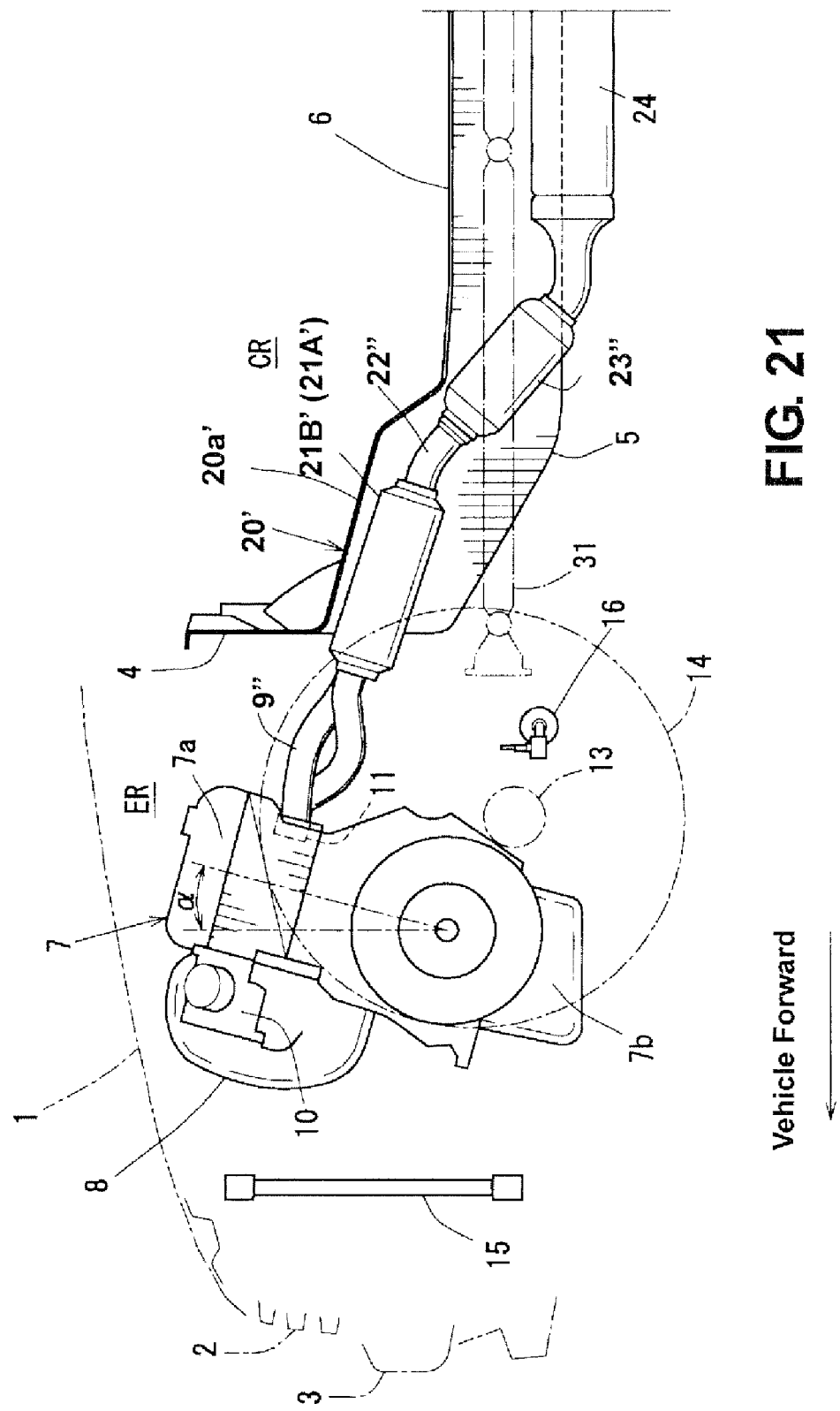
FIG. 21 is an entire side view of the front structure of the vehicle.
Figure 22:
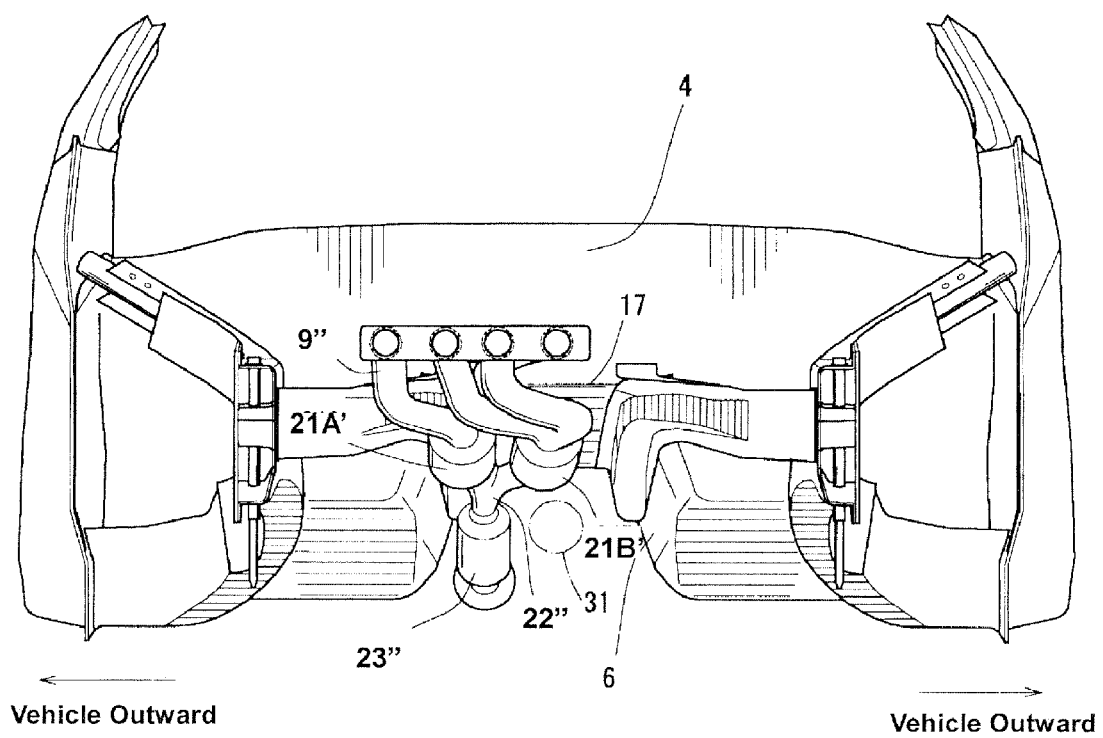
FIG. 22 is an entire elevation view, excluding the engine.

Herein, a modified front structure of a vehicle may be considered as shown in FIG. 19. In this modification, two flexible joints 123A, 123B are disposed right behind the exhaust manifold 9', a collective exhaust pipe 122' is disposed downstream of the flexible joints 123A, 123B, and then the catalyst 124 is disposed. Herein, the flexible joints 123A, 123B are provided side by side vertically inside the tunnel-expansion portion 20.

Accordingly, the layout of the flexible joints 123A, 123B can be properly achieved by using the relatively large space (inner space S) inside the tunnel-expansion portion 20 in this modification as well.

Also, since the vertically-moving space of the flexible joints 123A, 123B can be made compact likewise due to their vertical disposition, the components of the exhaust system moving into the tunnel-expansion portion 20 can be achieved surely, thereby improving the safety of the vehicle further even in a case where the two flexible joints 123A, 123B are disposed just behind the exhaust manifold 9'.

Herein, the propeller shaft 31 may be positioned at a level that is located substantially between the two flexible joints 123A, 123B that are disposed side by side vertically.

Embodiment 3

A front structure of a vehicle according to a third embodiment will described referring to FIGS. 20-29. The same components as those of the above-described first and second embodiments are denoted by the same reference characteristics, whose detailed descriptions are omitted here.

A tunnel-expansion portion 20' is provided at the front portion of the tunnel portion 6 so as to further project upward and widely in the vehicle width direction. The tunnel-expansion portion 20' is formed so as to allow the inside layout of components of the exhaust system that extends rearward from the exhaust manifold 9''' and the propeller 31 therein.

That is, the tunnel-expansion portion 20' includes the upper-wall face 20a' that extends slant rearward from the upper portion of the dash panel 4, corresponding to the specified grade of an exhaust manifold 9''', and the side-wall faces 20b', 20c' that have the width corresponding to the exhaust manifold 9''' having four branches and extend in the oblique shape respectively in such a manner that the distance of the front-side portion thereof is wider. Thus, the inner space S is enlarged by the tunnel-expansion portion 20', in which the components of the exhaust system, such as two direct catalysts 21A', 21B' and a Y-shaped exhaust pipe 22'' and the propeller shaft 31 extending longitudinally are located.

Figure 23:
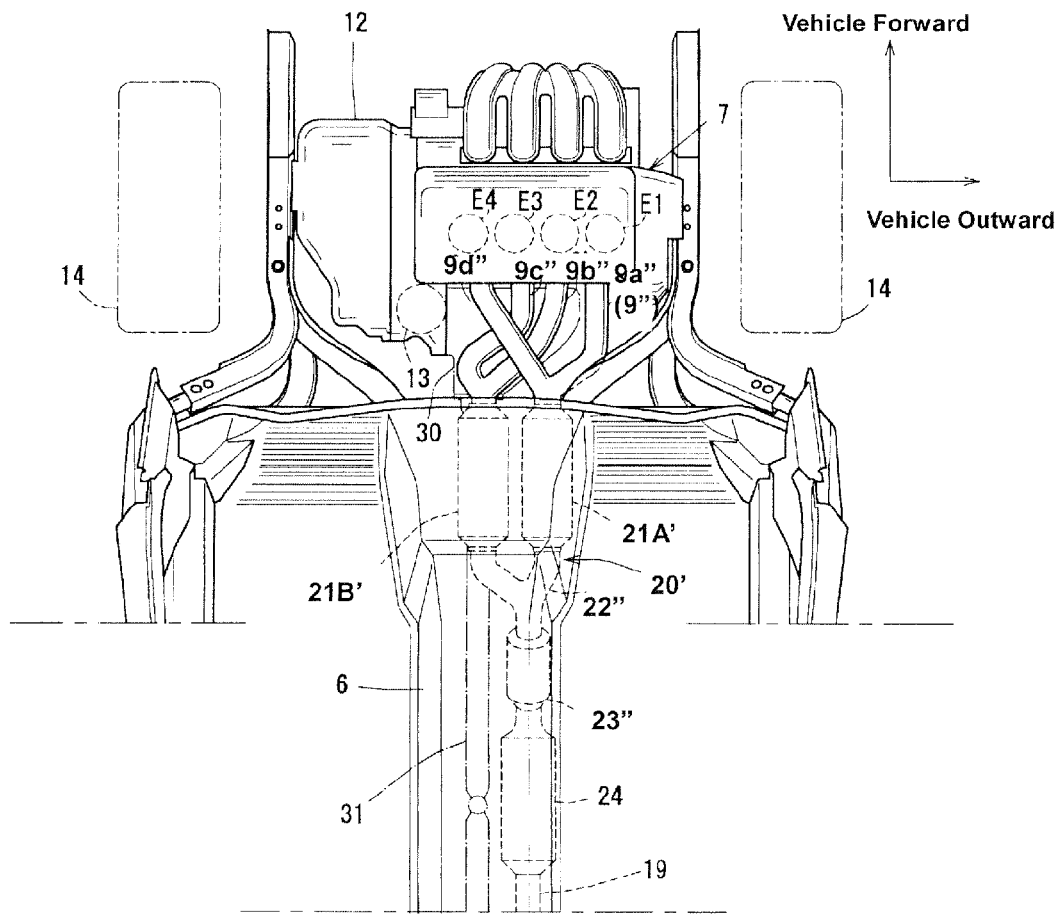
Figure 24:
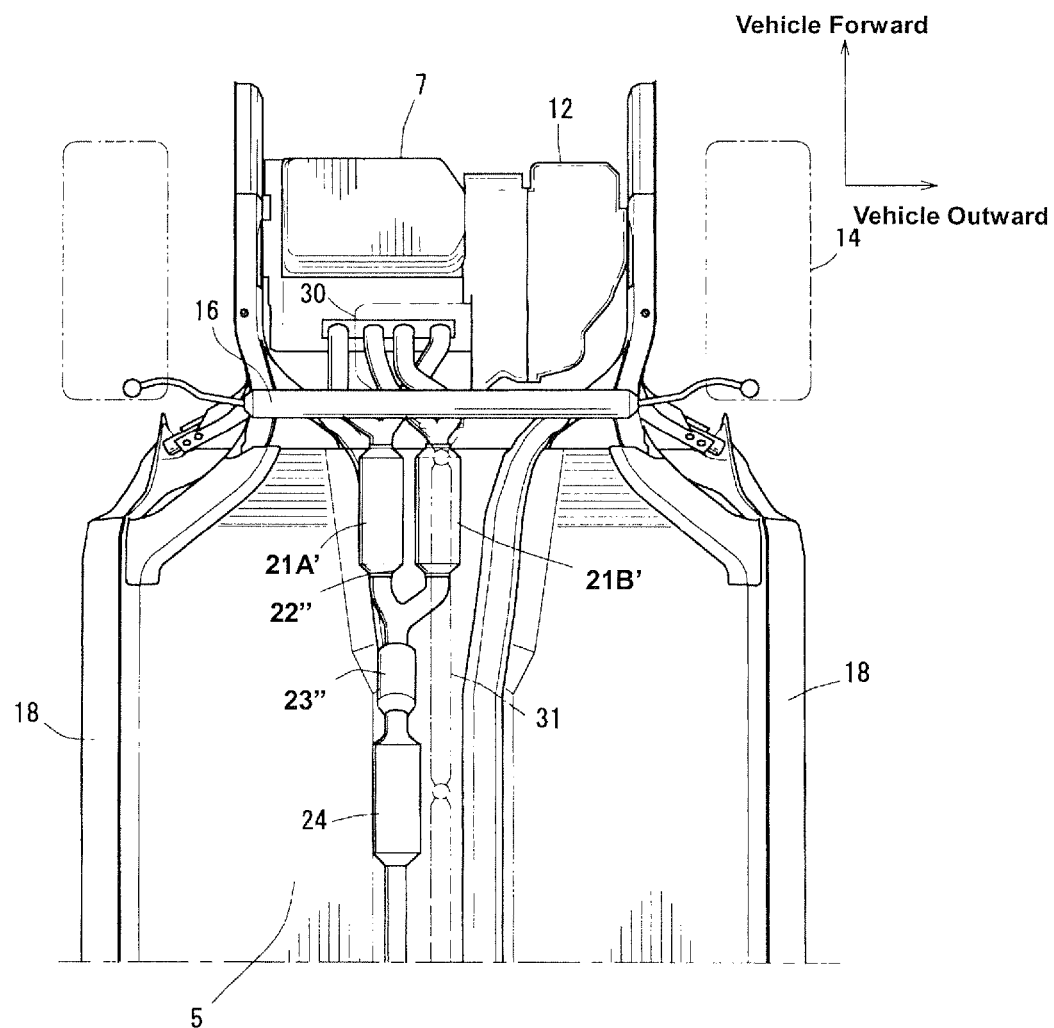

The components of the exhaust system will be described in detailed. As shown in FIG. 23, the exhaust manifold 9''' (9a''', 9b''', 9c''', 9d''') is disposed in back of the engine 7. The exhaust manifold 9''' is configured so that its four branches 9a''', 9b''', 9c''', 9d''' are collected to two branches once. That is, since the combustion timing of the engine is set in the order of the first cylinder E1→the third cylinder E3→the fourth cylinder E4→the second cylinder E2, the branches 9a''', 9d''' of the first and second cylinders E1, E4, which are located at the both sides, are collected, while the branches 9b", 9c" of the second and third cylinders E2, E3, which are located at the central side are collected.

Two catalysts 21A', 21B' that have a substantially cylindrical shape are provided side by side in the vehicle width direction corresponding to the above-described collection of the branches 9a", 9b", 9c", 9d". Specifically, the upper catalyst 21A' is provided corresponding to the collective pipe of the branch 9a" of the first cylinder E1 and the branch 9d" of the fourth cylinder 4E, and the lower catalyst 21B' is provided corresponding to the collective pipe of the branch 9b" of the second cylinder E2 and the branch 9c" of the third cylinder E3.

Thus, the catalysts 21A', 21B' are located side by side in the vehicle width direction. Accordingly, the exhaust gas from the exhaust branches 9a", 9b", 9c", 9d" can be discharged smoothly toward the downstream, without an offset vertically.

The catalysts 21A', 21B', which are comprised of the three-way catalyst to purify HC and CO primarily at the cold engine operation, are disposed at this location.

The Y-shaped exhaust pipe 22" that has the substantially Y shape to collect two passages into one is provided downstream. Since the exhaust gas flowing down through the catalysts 21A', 21B' may not be influenced by an exhaust interference very much, the exhaust system is configured so that the exhaust pipes are collected into the one passage at this point eventually.

A flexible joint 23" that has a substantially cylindrical shape is provided further downstream to absorb vibrations of the engine 7, such as rolling. Thus, this exhaust system including the flexible joint 23" is supposed to move along with the engine 7.

The catalysts 21A', 21B' and the Y-shaped pipe 22' of the exhaust system are disposed inside the tunnel-expansion portion 20' at the font of the tunnel portion 6 as shown in FIG. 23.

Figure 25:
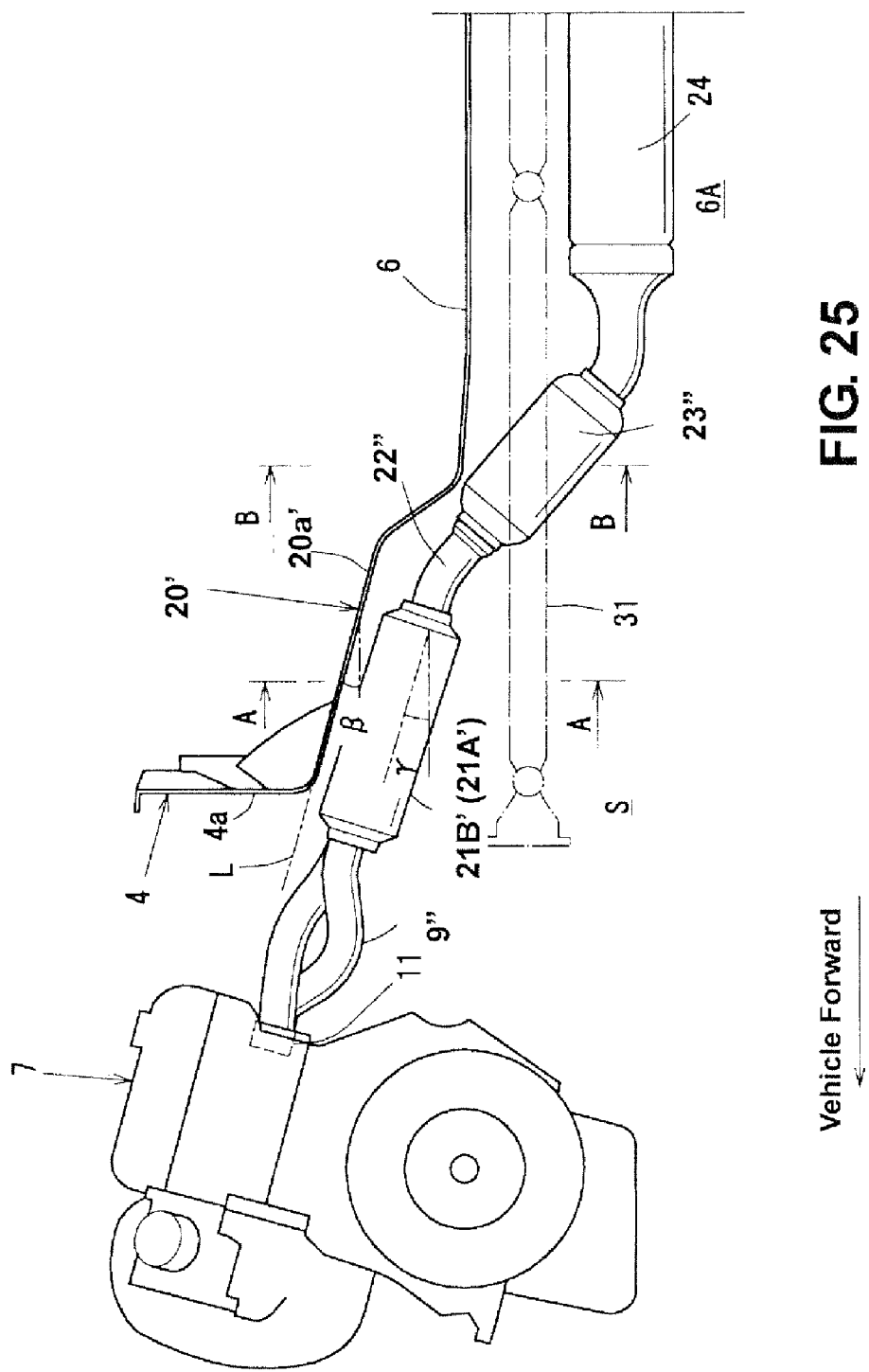
FIG. 25 is a detailed side sectional view of the vicinity of the tunnel-expansion portion.
Figure 26:
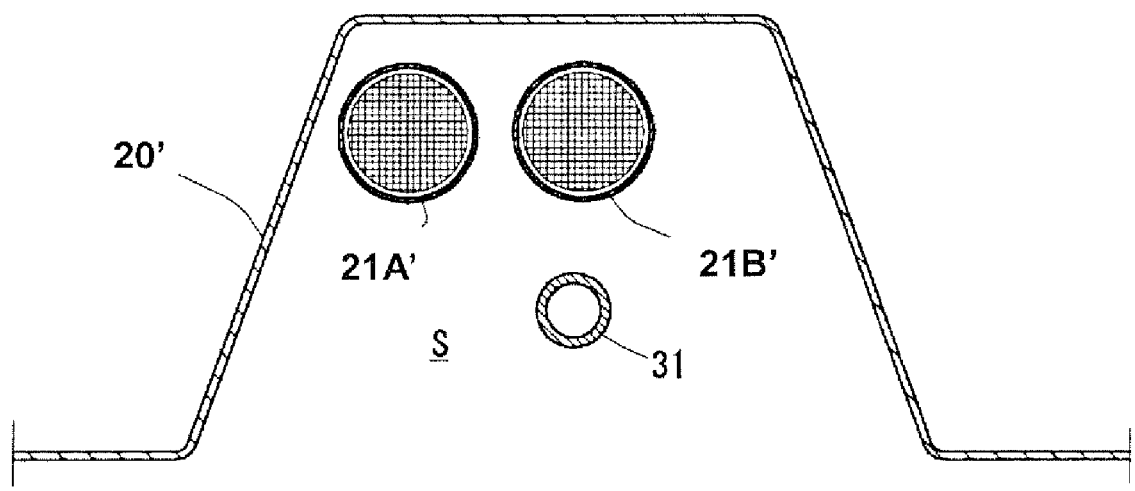
FIG. 26 is a sectional view taken along line of A-A.

The position relationship between the tunnel-expansion portion 20" and the components of the exhaust system and the propeller shaft 31 will be described specifically referring to FIGS. 25 and 26. FIG. 25 is a detailed side sectional view of the vicinity of the tunnel-expansion portion. FIG. 26 is a sectional view taken along line A-A of FIG. 25.

The upper-wall face 20a' of the tunnel-expansion portion 20' is formed so as to have a slant with a specified slant angle β (e.g., β=20 degrees) as shown in FIG. 25. This slant angle β is almost the same as a slant angle γ (e.g., γ=20 degrees) of the catalyst 21A', 21B'. This is to make the exhaust system moves into the tunnel portion 6 properly (smoothly) with guidance of the upper-wall face 20a' at the vehicle crash, which will be described later.

Further, the exhaust port 11 is located below an extension line L of the slant of the upper-wall face 20a'. This is to guide the exhaust manifold 9" into the space 6A of the tunnel portion 6 smoothly at the vehicle crash and also to provide the straight-extending layout of the components of the exhaust system properly.

Also, the catalysts 21A', 21B' disposed inside the tunnel-expansion portion 20' are provided side by side in the vehicle width direction and extend in the vehicle longitudinal direction. The propeller shaft 31 is disposed beside the catalysts 21A', 21B'.

As shown in FIG. 26, the catalyst disposed in the inner space S of the tunnel-expansion portion 20' is configured so that the first catalyst 21A' and the second catalyst 21B' are located at the same level. Thus, since the both catalysts 21A', 21B' are disposed at the same level in the side view, the components of the exhaust system can be located substantially straightly, thereby improving the exhaust efficiency.

Further, since the propeller shaft 31 is located below the catalysts 21A', 21B', the upper portion of the inner space S of the tunnel-expansion portion 20' can be properly used for the layout space of the catalysts 21A', 21B'.

As shown in FIG. 25, the single flexible joint 23" is provided downstream of the catalysts 21A', 21B' via the Y-shaped exhaust pipe 22". The flexible joint 23" is disposed beside the propeller shaft 31 so as to have a slant greater than that of the catalysts 21A', 21B'.

Figure 27:
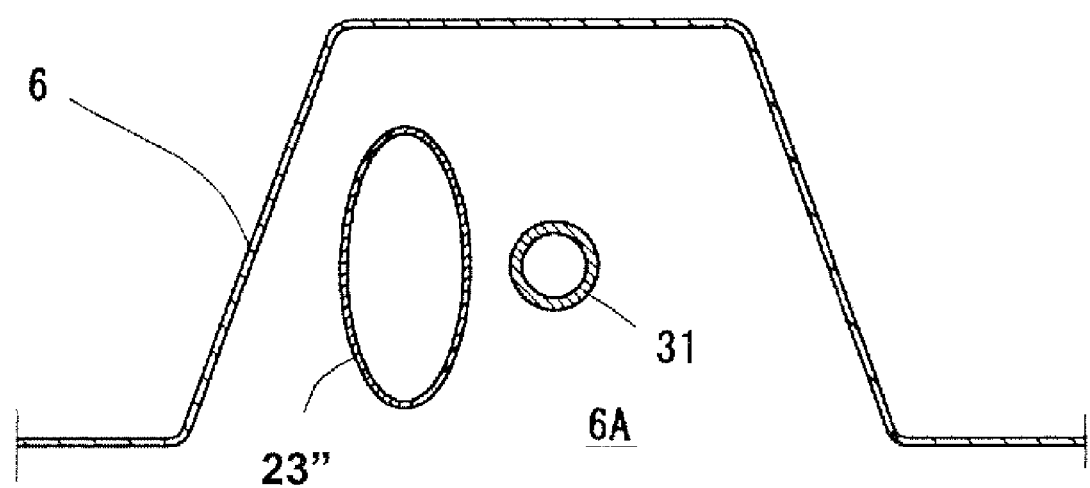
FIG. 27 is a sectional view taken along line of B-B.

As shown in FIG. 27, since the flexible joint 23" is located beside the propeller shaft 31, the exhaust system and the propeller shaft 31 can be disposed within the narrower space of the tunnel portion 6.

A movement at the vehicle crash will be described referring to FIGS. 28A, 28B, 28C.

Figure 28A:
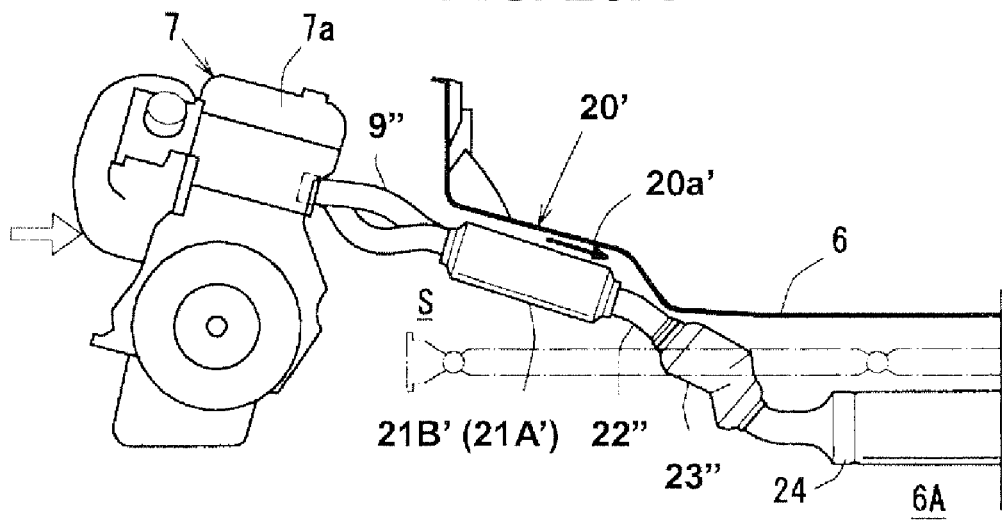
FIGS. 28A, 28B, 28C are explanatory diagrams showing a movement state at the vehicle crash in the side view.
Figure 28B:
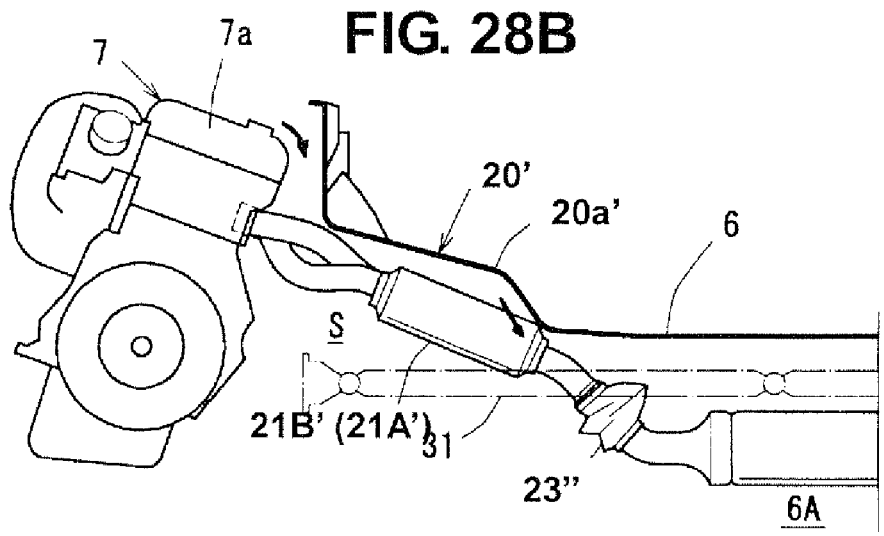
Figure 28C:
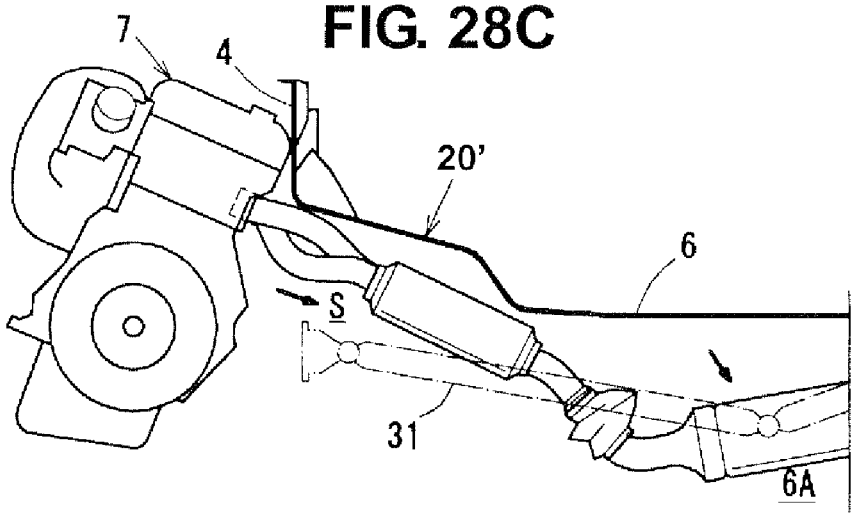

FIGS. 28A, 28B, 28C are explanatory diagrams showing the movement state at the vehicle crash in the side view, FIG. 28A shows the one in an initial stage; FIG. 28B shows the one in a middle stage; and FIG. 28C shows the one in a latter stage.

When a crash load F acts as shown in FIG. 28A, the engine 7 and the exhaust manifold 9" retreat. Herein, since the upper-wall face 20a' of the tunnel-expansion portion 20' has a slant, the components (9', 21A', 21B', 22", 23", 24) of the exhaust system is guided downward with the exhaust manifold 9" and the like that contact the upper-wall face 20a'.

The flexible joint 23" behind the catalysts 21A', 21B' is flexible, so it bends and the components (9', 21A', 21B', 22", 23", 24) of the exhaust system can move into the inner space S, 6A of the tunnel-expansion portion 20' and the tunnel portion 6 further easily.

When the time has passed to the middle stage shown in FIG. 28B, the catalysts 21A', 21B' are guided downward by the upper-wall face 20a' of the tunnel-expansion portion 20'. Thereby, the engine 7 is rotated further in such a manner that the upper portion 7a moves rearward, so that the components (9", 21A', 21B', 22", 23", 24) of the exhaust system can move into the spaces S, 6A of the tunnel-expansion portion 20' and the tunnel portion 6 further smoothly.

Then, when the time has passed to the latter stage shown in FIG. 28C, the components (9", 21A', 21B', 22", 23", 24) of the exhaust system move into the tunnel-expansion portion 20' and the tunnel portion 6 almost entirely. Thus, the dash panel 4 is not improperly influenced by the components (9", 21A', 21B', 22", 23", 24) of the exhaust system.

Further, there is further provided a crash safety mechanism to allow dropping of the propeller shaft 31 at the vehicle crash at a center bearing support, not illustrated, for the propeller shaft 31. Accordingly, since it drops out of the tunnel portion 6 as shown, the propeller shaft 31 may not prevent the engine 7 from retreating, so that the safety of the vehicle can be improved. Herein, the crash safety mechanism of the propeller shaft 31 may be comprised of a collapsible mechanism in which the shaft 31 is shortened by a compressive force that acts in its axial direction.

Thus, even in a case where two catalysts 21A', 21B' are disposed side by side in the vehicle width direction, the catalysts 21A', 21B' can move downward without prevention of the propeller shaft 31 dropping, thereby further improving the safety at the vehicle crash.

Hereinafter, the operation and effects of the present embodiment will be described.

In the front structure of the vehicle according to the present embodiment, the catalysts 21A', 21B' are disposed substantially side by side in the vehicle width direction at a location that corresponds to the tunnel-expansion portion 20". Whereby, the two catalysts 21A', 21B' can be located substantially straightly when viewed from the side, without offsetting vertically. Thus, the exhaust efficiency of the engine 7 can be improved.

Further, according to the present embodiment, there is provided the propeller shaft 31 to transmit the drive force of the engine to the rear wheels, and the propeller shaft 31 is disposed below the two catalysts 21A', 21b'. Thereby, the catalysts 21A', 21B' can be properly disposed by using the space above the propeller shaft 31. Thus, the two catalysts 21A', 21B' can be disposed so as to extend as straightly as possible without receiving any restriction from the propeller shaft 31. Accordingly, the exhaust efficiency of the engine 7 of the four-wheel-drive vehicle can be improved.

Also, according to the present embodiment, there is provided the flexible joint 23" at a collective portion of the exhaust system, and the flexible joint 23" is disposed on a side of the propeller shaft 31. The exhaust system can be disposed so as to extend rearward and downward avoiding the propeller shaft 31, with a narrow disposition space. Thus, the straight-extending layout of the components (9'", 21A', 21B', 22'", 23", 24) of the exhaust system can be achieved properly, without improperly increasing the width of the tunnel portion 6 and the tunnel-expansion portion 20' in the vehicle width direction.

Figure 29:
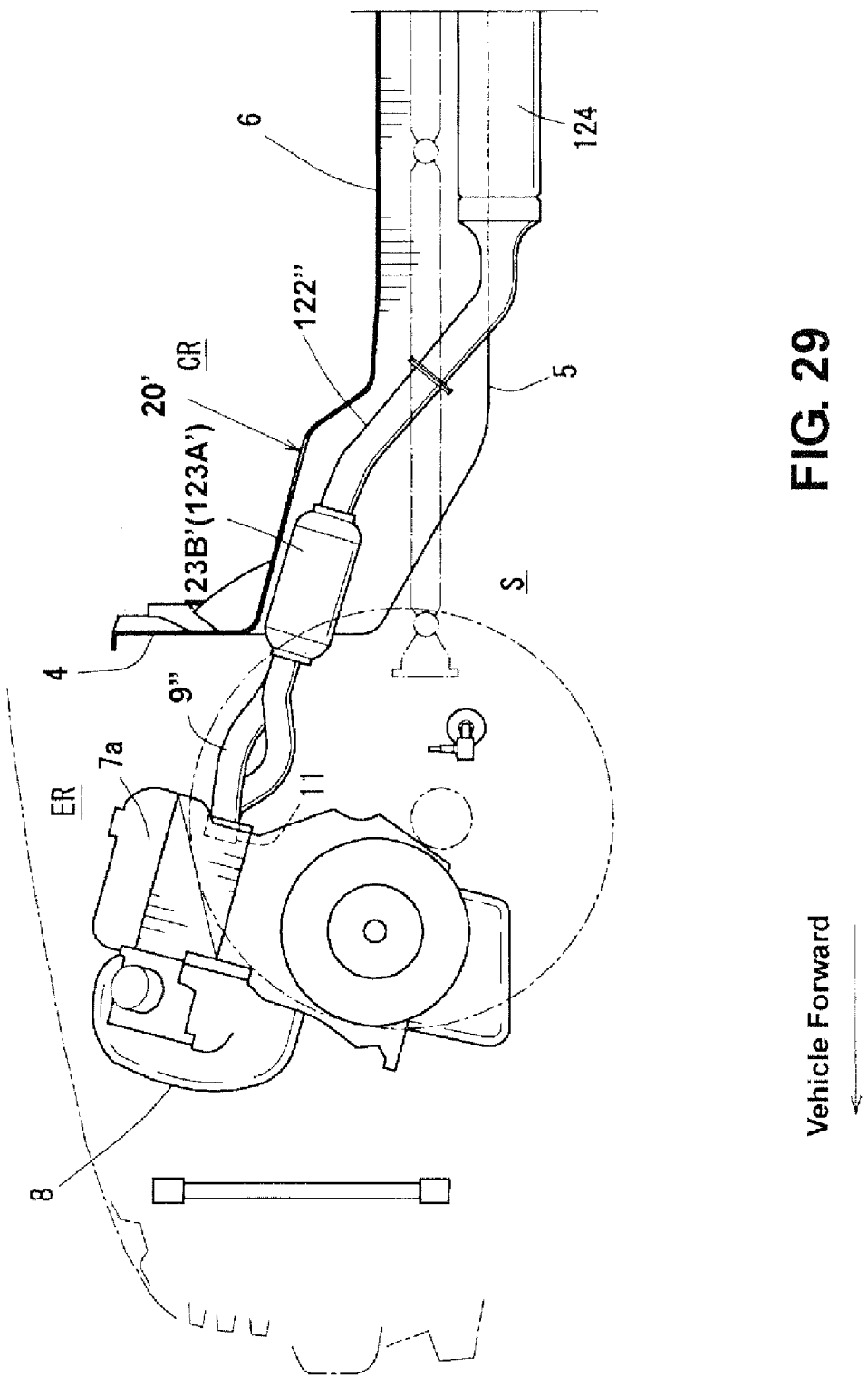
FIG. 29 is an entire side view of further another modified front structure of the vehicle.

Herein, a modified front structure of a vehicle may be considered as shown in FIG. 29. In this modification, two flexible joints 123A', 123B' are disposed right behind the exhaust manifold 9'" (only single one illustrated in the figure), a collective exhaust pipe 122" is disposed downstream of the flexible joints 123A', 123B', and then the catalyst 124 is disposed. Herein, the flexible joints 123A', 123B' are provided side by side in the vehicle width direction inside the tunnel-expansion portion 20'.

Accordingly, the layout of the flexible joints 123A', 123B' can be properly achieved by using the relatively large space (inner space S) inside the tunnel-expansion portion 20' in this modification as well.

Also, since the flexible joints 123A', 123B' are disposed side by side in the vehicle width direction, the components of the exhaust system can be disposed substantially straightly, without offsetting vertically. Accordingly, the exhaust efficiency can be improved.

Thus, even in a case where two flexible joints 123A', 123B' are disposed right behind the exhaust manifold 9'", the exhaust efficiency can be improved, thereby improving the engine output.

In correspondence between the constitution of the present invention and the above-described embodiments, the intake pipe corresponds to the intake manifold 8 and the surge tank 10, the exhaust pipe corresponds to the exhaust manifold 9, 9', 9'", catalyst 21, 21A, 21B, 21A', 21B', Y-shaped exhaust pipe 22, 22', 22", 122, 122', 122", flexible joint 23, 23", 123, 123A, 123B, 123A', 123B', under-foot catalyst 24, 124, the steering mechanism corresponds to the steering rack 16. However, the present invention should not be limited to the above-described embodiments, but any other modifications and improvements may be applied.

Although the above-described embodiment described the general vehicle equipped with the transmission 12, the present invention can be applied to a front structure of a hybrid vehicle. Further, the collective pipe right behind the exhaust manifold may be comprised of simple cylindrical pipes, without the catalyst or the flexible joint. Also, the location of those may be partially overlapped in the plan view or in the side view. And, the exhaust manifold is not limited to the above-described ones, and the number of its collective branch may be three of more, instead of two.

What is claimed is:

1. A front structure of a vehicle comprising:
    an engine laterally disposed in an engine room at a front portion of the vehicle;
    an intake pipe of the engine, the intake pipe being disposed in front of the engine;
    an exhaust pipe of the engine, the exhaust pipe being disposed in back of the engine so as to extend downward and rearward from an exhaust port provided at an upper portion of the engine with a specified grade;
    a tunnel portion provided at a center, in a vehicle width direction, of a connection portion between a dash panel to constitute a front wall of a vehicle compartment and a floor panel, the tunnel portion being configured to project toward an inside of the vehicle compartment and extend in a vehicle longitudinal direction; and
    a tunnel-expansion portion provided at a front portion of the tunnel portion, the tunnel-expansion portion being configured to project upward greatly along the exhaust pipe, the tunnel-expansion portion including an upper-wall face that has a slant that corresponds to the specified grade of the exhaust pipe,
    wherein at the exhaust pipe is provided a catalyst, which is disposed at a location that corresponds to the tunnel-expansion portion so as to extend slant downward.

2. The front structure of a vehicle of claim 1, wherein the exhaust port of the engine is provided so as to be located below an extension line of the slant of the upper-wall face of the tunnel-expansion portion.

3. The front structure of a vehicle of claim 1, wherein the exhaust pipe is comprised of a plurality of pipes that are located substantially side by side in the vehicle width direction, and the tunnel-expansion portion has side-wall faces thereof that are away from each other with a specified distance in the vehicle width direction that is greater than a width of the plurality of exhaust pipes located side by side.

4. The front structure of a vehicle of claim 3, wherein the side-wall faces of the tunnel-expansion portion are disposed in an oblique shape respectively in such a manner that the distance of a front-side portion thereof is wider, and an oblique angle of the side-wall faces of the tunnel-expansion portion is configured to be greater than an oblique angle of the exhaust pipes located at both-side ends that are provided obliquely so as to extend inwardly.

5. The front structure of a vehicle of claim 3, wherein the catalyst is comprised of plural catalysts where the plural exhaust pipes are collected, respectively.

6. The front structure of a vehicle of claim 1, wherein the exhaust pipe comprises a plurality of separate pipes that is connected to cylinders of the engine and the catalyst is comprised of a plurality of catalysts where the plural separate pipes are collected, respectively, and the plural catalysts are disposed substantially side by side in a vertical direction at the location that corresponds to the tunnel-expansion portion so as to extend slant downward, respectively.

7. The front structure of a vehicle of claim 6, wherein there is provided a propeller shaft to transmit a drive force of the engine to rear wheels, and the propeller shaft is disposed on a side of the plural catalysts in the vehicle width direction.

8. The front structure of a vehicle of claim 7, wherein the propeller shaft is positioned at a level that is located substantially between the plural catalysts in the vertical direction.

9. The front structure of a vehicle of claim 1, wherein the exhaust pipe comprises a plurality of separate pipes that is connected to cylinders of the engine and the catalyst is comprised of a plurality of catalysts where the plural separate pipes are collected, respectively, and the plural catalysts are disposed substantially side by side in the vehicle width direction at the location that corresponds to the tunnel-expansion portion so as to extend slant downward, respectively.

10. The front structure of a vehicle of claim 9, wherein there is provided a propeller shaft to transmit a drive force of the engine to rear wheels, and the propeller shaft is disposed below the plural catalysts.

11. The front structure of a vehicle of claim 10, wherein the exhaust pipe further comprises a collective portion where the plural catalysts are collected, and the collective portion is disposed on a side of the propeller shaft.

12. The front structure of a vehicle of claim 1, wherein a steering mechanism to steer front wheels is disposed in front of the catalyst.

13. The front structure of a vehicle of claim 1, wherein an angle of the slant that the upper-wall face of the tunnel-expansion portion has is set to be greater than a slant angle of the catalyst that is disposed at the location that corresponds to the tunnel-expansion portion so as to extend slant downward.

14. A front structure of a vehicle, comprising:
   an engine laterally disposed in an engine room at a front portion of the vehicle;
   an intake pipe of the engine, the intake pipe being disposed in front of the engine;
   an exhaust pipe of the engine, the exhaust pipe being disposed in back of the engine so as to extend downward and rearward from an exhaust port provided at an upper portion of the engine with a specified grade;
   a tunnel portion provided at a center, in a vehicle width direction, of a connection portion between a dash panel to constitute a front wall of a vehicle compartment and a floor panel, the tunnel portion being configured to project toward an inside of the vehicle compartment and extend in a vehicle longitudinal direction; and
   a tunnel-expansion portion provided at a front portion of the tunnel portion, the tunnel-expansion portion being configured to project upward greatly along the exhaust pipe, the tunnel-expansion portion including an upper-wall face that has a slant that corresponds to the specified grade of the exhaust pipe,
   wherein the exhaust port of the engine is provided so as to be located below an extension line of the slant of the upper-wall face of the tunnel-expansion portion, and at the exhaust pipe is provided a flexible tube, which is disposed at a location that corresponds to the tunnel-expansion portion.

15. The front structure of a vehicle of claim 14, wherein the exhaust pipe comprises a plurality of separate pipes that is connected to cylinders of the engine and the flexible tube is comprised of a plurality of flexible tubes where the plural separate pipes are collected, respectively, and the plural flexible tubes are disposed substantially side by side in a vertical direction at the location that corresponds to the tunnel-expansion portion so as to extend slant downward, respectively.

16. The front structure of a vehicle of claim 14, wherein the exhaust pipe comprises a plurality of separate pipes that is connected to cylinders of the engine and the flexible tube is comprised of a plurality of flexible tubes where the plural separate pipes are collected, respectively, and the plural flexible tubes are disposed substantially side by side in the vehicle width direction at the location that corresponds to the tunnel-expansion portion so as to extend slant downward, respectively.

17. A front structure of a vehicle, comprising:
   an engine laterally disposed in an engine room at a front portion of the vehicle;
   an intake pipe of the engine, the intake pipe being disposed in front of the engine;
   an exhaust pipe of the engine, the exhaust pipe being disposed in back of the engine so as to extend downward and rearward from an exhaust port provided at an upper portion of the engine with a specified grade;
   a tunnel portion provided at a center, in a vehicle width direction, of a connection portion between a dash panel to constitute a front wall of a vehicle compartment and a floor panel, the tunnel portion being configured to project toward an inside of the vehicle compartment and extend in a vehicle longitudinal direction; and
   a tunnel-expansion portion provided at a front portion of the tunnel portion, the tunnel-expansion portion being configured to project upward greatly along the exhaust pipe, the tunnel-expansion portion including an upper-wall face that has a slant that corresponds to the specified grade of the exhaust pipe,
   wherein the exhaust port of the engine is provided so as to be located below an extension line of the slant of the upper-wall face of the tunnel-expansion portion, and the engine is provided slant in such a manner that the upper portion thereof is located rearward.

18. The front structure of a vehicle of claim 17, wherein at the exhaust pipe is provided a catalyst, which is disposed at a location that corresponds to the tunnel-expansion portion so as to extend slant downward.

* * * * *